US008192339B2

(12) United States Patent
Suzuki et al.

(10) Patent No.: US 8,192,339 B2
(45) Date of Patent: Jun. 5, 2012

(54) DEVELOPING ROLLER, MANUFACTURING METHOD THEREOF, DEVELOPING APPARATUS AND IMAGE FORMING APPARATUS

(75) Inventors: Junichi Suzuki, Chino (JP); Noboru Sakurai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1207 days.

(21) Appl. No.: 11/935,946

(22) Filed: Nov. 6, 2007

(65) Prior Publication Data

US 2008/0107455 A1 May 8, 2008

(30) Foreign Application Priority Data

Nov. 7, 2006 (JP) ................................ 2006-302083

(51) Int. Cl.
*A01B 29/00* (2006.01)

(52) U.S. Cl. ............................... 492/28; 492/31; 492/33

(58) Field of Classification Search .................. 399/279, 399/286; 492/28, 30, 31, 33, 34, 36, 37; 29/289
See application file for complete search history.

(56) References Cited

U.S. PATENT DOCUMENTS 4,092,165 A 5/1978 Andrus et al.
4,368,971 A * 1/1983 Watanabe et al. ............. 399/276
4,780,741 A 10/1988 Wada et al.
4,978,583 A * 12/1990 Wakui et al. .................. 428/600
5,153,376 A 10/1992 Tomita
5,339,141 A 8/1994 Suzuki et al.
5,387,966 A * 2/1995 Karashima .................... 399/286
5,391,135 A * 2/1995 Kuroki et al. .................. 492/35
5,502,552 A 3/1996 Iwata et al.
5,552,235 A * 9/1996 Bastawros et al. ............ 428/687
5,600,417 A 2/1997 Iguchi et al.
5,794,109 A * 8/1998 Ota et al. ...................... 399/286
5,797,827 A * 8/1998 Sondergeld ..................... 492/37
5,812,917 A * 9/1998 Iwata et al. ................... 399/281
6,183,927 B1 2/2001 Magome et al.
6,201,942 B1 * 3/2001 Honda et al. .................. 399/286
6,317,220 B1 11/2001 Fujita et al.
6,360,069 B1 3/2002 Mimura et al.
6,512,598 B2 1/2003 Fujita et al.
6,873,816 B2 * 3/2005 Akashi et al. ................. 399/286
6,925,277 B2 8/2005 Sugihara
6,941,100 B2 * 9/2005 Yamada et al. ............... 399/279
2005/0176566 A1 * 8/2005 Vestola et al. .................. 492/31
2006/0056880 A1 3/2006 Okamoto
2006/0099011 A1 5/2006 Kamijo et al.

(Continued)

FOREIGN PATENT DOCUMENTS

JP 55-026526 2/1980

(Continued)

OTHER PUBLICATIONS

EPO; Extended European Search Report in related foreign application (EP 08009803.1) mailed Feb. 2, 2010.

*Primary Examiner* — David Bryant
*Assistant Examiner* — Jacob Cigna
(74) *Attorney, Agent, or Firm* — Workman Nydegger

(57) ABSTRACT

A developing roller on a circumferential surface of which toner is held is provided. In the developing roller, intersecting first and second grooves are formed. Protrusion portions are disposed in areas surrounded by the first and second grooves. The protrusion portions have minute projections.

7 Claims, 9 Drawing Sheets

U.S. PATENT DOCUMENTS

| | | | | |
|---|---|---|---|---|
| 2006/0111223 | A1* | 5/2006 | Chou | 492/37 |
| 2007/0110481 | A1 | 5/2007 | Yamada et al. | |
| 2007/0110484 | A1 | 5/2007 | Yamada et al. | |
| 2008/0298851 | A1 | 12/2008 | Yamada et al. | |
| 2008/0298852 | A1 | 12/2008 | Yamada | |

FOREIGN PATENT DOCUMENTS

| | | | | |
|---|---|---|---|---|
| JP | 59-189374 | A | | 10/1984 |
| JP | 61-147264 | | | 7/1986 |
| JP | 63-304277 | | | 12/1988 |
| JP | 01-102486 | | | 4/1989 |
| JP | 02-235080 | A | | 9/1990 |
| JP | 03-084570 | A | | 4/1991 |
| JP | 04-295871 | A | | 10/1992 |
| JP | H05-25459 | | | 2/1993 |
| JP | 05-142950 | | | 6/1993 |
| JP | 06-124043 | | | 5/1994 |
| JP | 06-138774 | | | 5/1994 |
| JP | 07-013410 | | | 1/1995 |
| JP | 08-160736 | A | | 6/1996 |
| JP | 08-286497 | | | 11/1996 |
| JP | 08-328376 | | | 12/1996 |
| JP | 2601275 | | | 4/1997 |
| JP | 09-197800 | | | 7/1997 |
| JP | 10-207172 | | | 8/1998 |
| JP | 11-133728 | A | | 5/1999 |
| JP | 11133728 | A | * | 5/1999 |
| JP | 11-174821 | | | 7/1999 |
| JP | 2000-206780 | A | | 7/2000 |
| JP | 2000-206783 | A | | 7/2000 |
| JP | 2000-242073 | | | 9/2000 |
| JP | 2000-258989 | | | 9/2000 |
| JP | 2000-275957 | | | 10/2000 |
| JP | 2001-134069 | | | 5/2001 |
| JP | 2002-112224 | | | 4/2002 |
| JP | 2002-372855 | | | 12/2002 |
| JP | 2003-057940 | | | 2/2003 |
| JP | 2003-107905 | | | 4/2003 |
| JP | 2003-208012 | | | 7/2003 |
| JP | 2003-263018 | | | 9/2003 |
| JP | 2003-316146 | | | 11/2003 |
| JP | 2004-020581 | | | 1/2004 |
| JP | 2004-034537 | | | 2/2004 |
| JP | 2004-212520 | | | 7/2004 |
| JP | 2005-049649 | | | 2/2005 |
| JP | 2006-259384 | | | 9/2006 |
| JP | 2006-343542 | A | | 12/2006 |
| JP | 2007-121947 | | | 5/2007 |
| JP | 2007-121950 | | | 5/2007 |
| JP | 2007-121974 | | | 5/2007 |
| JP | 2007-127800 | | | 5/2007 |
| JP | 4715451 | | | 7/2011 |

* cited by examiner

DEVELOPING ROLLER, MANUFACTURING METHOD THEREOF, DEVELOPING APPARATUS AND IMAGE FORMING APPARATUS

BACKGROUND OF THE INVENTION

1. Technical Field

The present invention relates to a developing roller, a manufacturing method thereof, a developing apparatus and an image forming apparatus.

2. Related Art

Image forming apparatus that adopt electrophotography, such as copiers and printers, form images of toner on paper and other recording media by a series of image forming processes including a charging process, an exposure process, a developing process, a transfer process and a fixing process.

For example, in a developing process, with a developing roller that carries toner brought into contact with a photosensitive member that carries an electrostatic latent image, charged toner is provided from the developing roller to the latent image to visualize the latent image as a toner image.

For example, a developing roller for single component development as described in JP-A-55-26526 has hitherto been known as a roller for providing (applying) powder such as toner.

The developing roller, however, is manufactured by blasting a cylindrical material, which will be the roller, so as to roughen the surface of the cylindrical material.

Therefore, there is a problem in that the deformation of the cylindrical material occurs because of the use of abrasive grains, resulting in low yield.

To solve this problem, a developing roller that is manufactured by roughening the surface of a cylindrical material by using a centerless grinder without blasting has been known (e.g. JP-A-8-328376).

However, because the grinding marks (unevenness) of this developing roller are formed along the rotation direction of the roller, if toner is to be charged by friction, a developer rolls along the rotational direction of the roller to thereby make small the frictional resistance due to unevenness.

As a result, the developing roller causes insufficient charging and fog to occur.

On the other hand, a developing roller has also been known that has a large number of first grooves disposed in parallel to each other and a large number of second grooves disposed in parallel to each other to cross the first grooves such that a large number of grid-shaped protrusion portions defined by the first and second grooves is formed.

Such a developing roller, however, has a problem in that since the cross section of the groove is U-shaped and the top surface of the protrusion portion is a smooth surface, insufficient charging, toner leakage from a cartridge, and light and shade unevenness in an image occur.

SUMMARY

Advantages of the invention are to provide a developing roller and a manufacturing method thereof that prevent insufficient charging of toner and require less toner consumption caused by fog and to provide a developing apparatus including this developing roller, and an image forming apparatus including this developing apparatus.

Such advantages are achieved by the following aspects of the invention.

A developing roller according to a first aspect of the invention is a developing roller on a circumferential surface of which toner is held, which developing roller includes a plurality of first grooves formed in parallel to each other at approximately equal intervals, each in a direction inclined to a circumferential direction of the circumferential surface of the developing roller; a plurality of second grooves formed in parallel to each other at approximately equal intervals, each in a direction inclined to the circumferential direction of the circumferential surface of the developing roller, each second groove intersecting each first groove, the first groove and the second groove each having a U-shaped cross section; and a protrusion portion disposed in an area surrounded by the first groove and the second groove.

In the developing roller, the protrusion portion has on a top surface thereof a plurality of minute projections, and when a surface roughness Rz of the top surface is $R_O$, $R_O$ is 0.5 to 2 times an average grain size of a particle of the toner; when a distance from an average line of a roughness curve of the surface roughness $R_O$ to a deepest part of the first groove is $D_1$ and a distance from the average line of the roughness curve of the surface roughness $R_O$ to a deepest part of the second groove is $D_2$, each of $D_1$ and $D_2$ is 0.5 to 2 times the average grain size of the particle of the toner; and a relationship of the $R_O<D_1$ and the $R_O<D_2$ is satisfied.

Thus, in the developing roller, an area of the circumferential surface in which toner rolls increases.

Therefore, toner rolls on minute projections and protrusion portions, thereby allowing the toner to be uniformly charged.

As a result, printing to provide high-quality images that have no irregularity and less toner consumption due to fog can be achieved.

In the developing roller according to the first aspect of the invention, it is preferable that the minute projection be formed in a form of a protrusion extending along the circumferential direction of the circumferential surface of the developing roller.

Thus, the surface roughness of the top surface of each protrusion portion is made constant.

Therefore, since toner rolls on the circumferential surface of the developing roller, the toner can be more uniformly charged.

As a result, printing to provide high-quality images while maintaining a constant performance at all times can be achieved.

In the developing roller according to the first aspect of the invention, it is preferable that the first groove and the second groove each have an inner surface having a surface roughness Rz smaller than the surface roughness $R_O$ of the top surface of the protrusion portion.

Thus, toner smoothly moves in the groove, and therefore the toner can efficiently roll from the groove to the protrusion portion.

In the developing roller according to the first aspect of the invention, it is preferable that the first groove and the second groove intersect each other at an angle smaller than 90°.

Thus, many protrusion portions are formed along the circumferential direction of the circumferential surface of the developing roller.

Therefore, the number of rolling of toner on the protrusion portion increases, so that the toner is sufficiently charged.

In the developing roller according to the first aspect of the invention, it is preferable that a pitch between the protrusion portions adjacent each other be 50 to 100 μm.

Thus, an appropriate number of protrusion portions can be provided on the circumferential surface of the developing roller.

Therefore, toner rolls from a groove to a protrusion portion, and the protrusion portion to another groove, so that the toner can be sufficiently charged.

A method for manufacturing a developing roller according to a second aspect of the invention is a method for manufacturing a developing roller on a circumferential surface of which toner is held, which method includes (a) roughening the circumferential surface of a cylindrical roller base material so as to form a large number of minute projections; and (b) forming on the roughened circumferential surface of the roller base material a plurality of first grooves in parallel to each other at approximately equal intervals, each in a direction inclined to the circumferential direction of the circumferential surface of the roller base material, and a plurality of second grooves in parallel to each other at approximately equal intervals, each in a direction inclined to the circumferential direction of the circumferential surface of the roller base material, each second groove intersecting each first groove, by form rolling.

In the method, when a surface roughness Rz of the circumferential surface roughened in the step (a) is $R_O$, $R_O$ is 0.5 to 2 times an average grain size of a particle of the toner; and the form rolling in the step (b) is performed so that a minute projection formed in an area other than the first groove and the second groove remains.

Thus, the form rolling is performed so that the roughened surface remains. Therefore, a developing roller in which toner is sufficiently charged can easily be manufactured.

In the method for manufacturing a developing roller according to the second aspect of the invention, it is preferable that the roughening in the step (a) be performed so that the surface roughness $R_O$ of both end portions of the circumferential surface is smaller than the surface roughness $R_O$ of an intermediate portion of the circumferential surface.

Thus, the distance to the photosensitive member can be accurately set.

In the method for manufacturing a developing roller according to the second aspect of the invention, it is preferable that the roughening in the step (a) be performed so that a protrusion is formed circularly all around the circumferential surface of the roller base material.

Thus, the surface roughness of the roller base material is made constant.

Therefore, a developing roller without a variation in surface roughness of the top surface of each protrusion portion can be reliably manufactured.

In the method for manufacturing a developing roller according to the second aspect of the invention, it is preferable that the form rolling in the step (b) be performed such that when a distance from an average line of a roughness curve of the surface roughness $R_O$ to a deepest part of the first groove is $D_1$ and a distance from the average line of the roughness curve of the surface roughness $R_O$ to a deepest part of the second groove is $D_2$, each of $D_1$ and $D_2$ is 0.5 to 2 times the average grain size of the particle of the toner, and a relationship of the $R_O<D_1$ and the $R_O<D_2$ is satisfied.

Thus, grooves and protrusion portions with dimension accuracy are formed on the circumferential surface of the developing roller.

Therefore, a developing roller in which toner is sufficiently charged can be manufactured.

In the method for manufacturing a developing roller according to the second aspect of the invention, it is preferable that the form rolling in the step (b) be performed by sandwiching the roller base material with the roughened surface between a first rolling die in which a protrusion corresponding to the first groove is formed and a second rolling die in which a protrusion corresponding to the second groove is formed, and rotating the first rolling die and the second rolling die in the same direction.

Thus, a developing roller having the first groove and the second groove can be easily and reliably manufactured.

A developing apparatus according to a third aspect of the invention includes the developing roller according to the first aspect of the invention.

Thus, a developing apparatus with high reliability can be obtained.

An image forming apparatus according to a fourth aspect of the invention includes the developing apparatus according to the third aspect of the invention.

Thus, an image forming apparatus with high reliability can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described.

Preferred embodiments of a developing roller, a developing apparatus and an image forming apparatus of the invention will be described below with reference to the accompanying drawings.

First Embodiment

Figure 1:
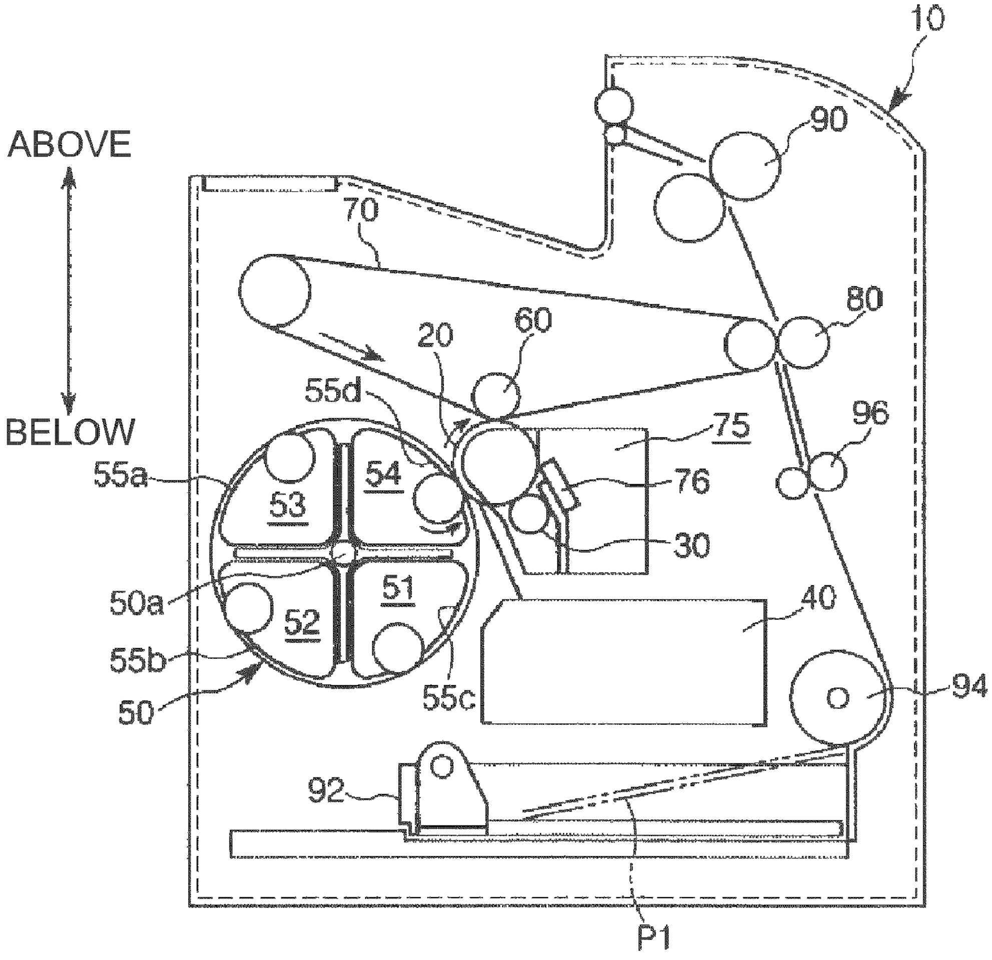
FIG. 1 is a schematic sectional view showing a schematic structure of an image forming apparatus of the invention.
Figure 2:
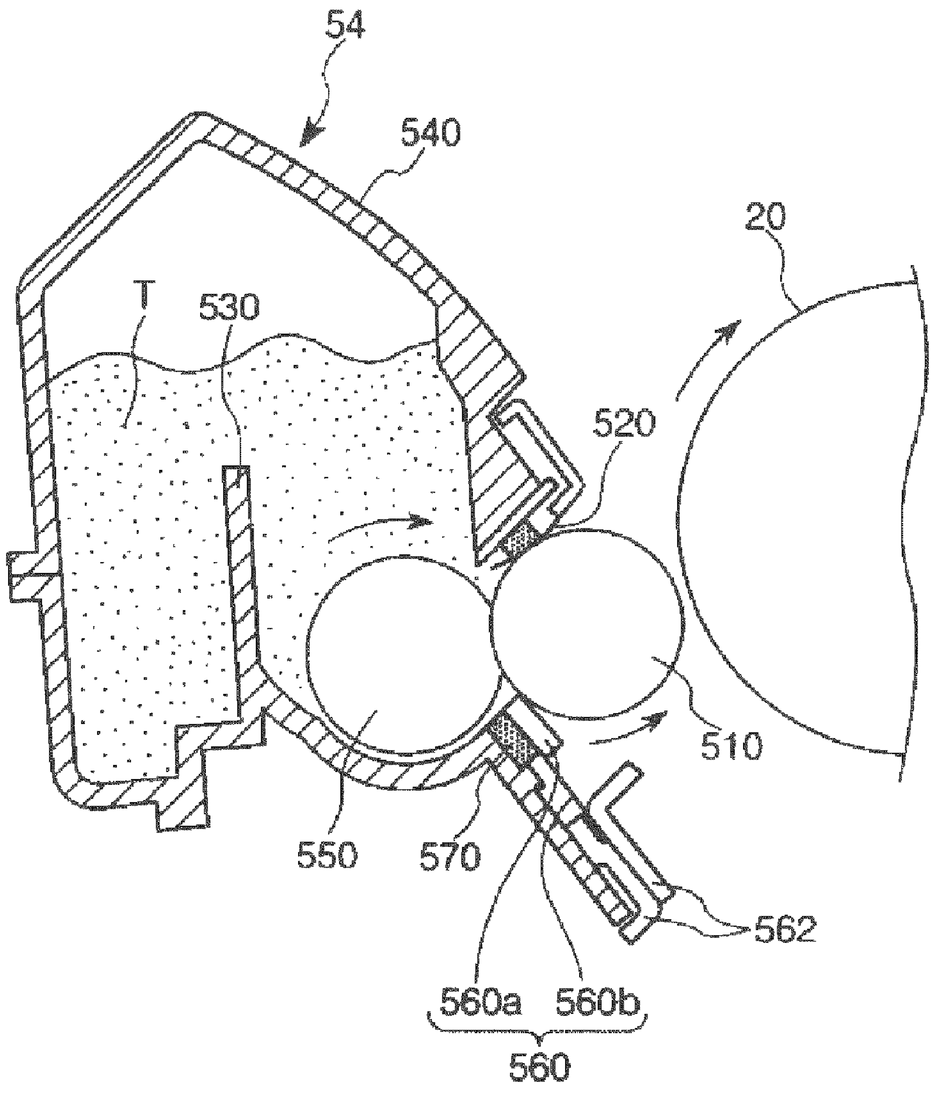
FIG. 2 is a schematic sectional view showing a schematic structure of a developing apparatus of the invention.

FIG. 1 is a schematic sectional view showing a schematic structure of an image forming apparatus in accordance with the invention, and FIG. 2 is a schematic sectional view showing a schematic structure of a developing apparatus in accordance with (a first embodiment of) the invention.

Note that hereinafter the upper side and the lower side in the figures will be referred to as “above” and “below”, respectively.

Image Forming Apparatus

Referring to FIG. 1, a laser-beam printer (hereinafter referred to only as a "printer") 10 as an example of an image forming apparatus will be described.

As shown in FIG. 1, the printer 10 has a photosensitive member 20 that carries a latent image and rotates in the arrow direction in the figure.

Disposed along the rotation direction (clockwise) of the photosensitive member 20 are a charging unit 30, an exposure unit 40, a developing unit 50, a primary transfer unit 60 and an intermediate transfer member 70, and a cleaning unit 75 sequentially in this order.

The printer 10 has, below in FIG. 1, a paper feed tray 92 that feeds a recording medium P1 such as paper.

A secondary transfer unit 80 and a fixing unit 90 are disposed toward downstream along the conveying direction of the recording medium P1 from the paper feed tray 92.

The photosensitive member 20 has a cylindrical conductive base material and a photosensitive layer formed on the circumferential surface thereof, and is rotatable in the arrow direction (clockwise) in FIG. 1 about the axis.

The charging unit 30 is a device for uniformly charging the surface of the photosensitive member 20 by corona charging and the like.

The exposure unit 40 is a device that receives image information from a host computer such as a personal computer, which is not shown, and illuminates the uniformly charged photosensitive member 20 with laser light in a desired pattern in accordance with the information, so that an electrostatic latent image is carried (formed) on the circumferential surface of the photosensitive member 20.

The developing unit 50 has four developing apparatus, that is, a black developing apparatus 51, a magenta developing apparatus 52, a cyan developing apparatus 53 and a yellow developing apparatus 54, and visualizes the latent image mentioned above into a toner image on the photosensitive member 20 selectively using the developing apparatus in accordance with the latent image on the photosensitive member 20.

The black developing apparatus 51, the magenta developing apparatus 52, the cyan developing apparatus 53 and the yellow developing apparatus 54 develop the latent image by using black (K) toner, magenta (M) toner, cyan (C) toner and yellow (Y) toner, respectively.

The developing unit 50 according to the present embodiment is rotatable so as to allow the four developing apparatus 51, 52, 53 and 54 to selectively (in a predetermined order) face the photosensitive member 20.

Specifically, in the developing unit 50, four developing apparatus 51, 52, 53 and 54 are held in four holding portions 55*a*, 55*b*, 55*c* and 55*d* of a holding member that is rotatable around a shaft 50*a*.

The developing apparatus 51, 52, 53 and 54 selectively face the photosensitive member 20 while maintaining their relative positions by rotation of the holding member.

The detailed structure of each developing apparatus will be described later.

The primary transfer unit 60 is a device for transferring a toner image formed on the photosensitive member 20 to the intermediate transfer member 70.

The intermediate transfer member 70, which is constituted of an endless belt, is rotationally driven (circulated) at approximately the same circumferential velocity as that of the photosensitive member 20 in the arrow direction shown in FIG. 1.

Carried on the intermediate transfer member 70 are toner images of at least one color of black, magenta, cyan and yellow.

For example, toner images of four colors, black, magenta, cyan and yellow, are sequentially transferred one atop another to form a full-color toner image.

The secondary transfer unit 80 is a device for transferring monochrome or full-color toner images formed on the intermediate transfer member 70 onto the recording medium P1 made of paper, film, cloth or the like.

The fixing unit 90 is a device for heating and pressurizing the recording medium P1 on which the toner image has been transferred to fusion bond the toner image mentioned above onto the recording medium P1, thereby fixing the toner image as a permanent image.

The cleaning unit 75 has a cleaning blade 76 made of rubber that is placed between the primary transfer unit 60 and the charging unit 30 to be brought in contact with the surface of the photosensitive member 20.

This unit is a tool for removing, with the cleaning blade 76, the toner on the photosensitive member 20 remaining after a toner image is transferred onto the intermediate transfer member 70 by the primary transfer unit 60.

Next, operations of the printer 10 having such a structure as described above will be explained.

The photosensitive member 20, a developing roller 510 provided corresponding to each of the developing apparatus 51, 52, 53 and 54 of the developing unit 50, which will be described later (see FIGS. 2 and 3), and the intermediate transfer member 70 start rotating by commands from a host computer (not shown).

As rotating, the photosensitive member 20 is sequentially charged by the charging unit 30.

As the photosensitive member 20 rotates, the charged area on the photosensitive member 20 reaches the exposure position at which the charged area faces the exposure unit 40.

The exposure unit 40 forms in the charged area a latent image in accordance with the image information on the first color item, e.g. yellow Y.

As the photosensitive member 20 rotates, the latent image formed on the photosensitive member 20 reaches a developing position.

At this position, the yellow developing apparatus 54 develops the latent image with yellow toner.

A yellow toner image is thus formed on the photosensitive member 20.

At this point, in the developing unit 50, the yellow developing apparatus 54, which is at the developing position, faces the photosensitive member 20 (see FIG. 1).

As the photosensitive member 20 rotates, the yellow toner image formed on the photosensitive member 20 reaches a primary transfer position. At this position, the primary transfer unit 60 transfers the yellow toner image to the intermediate transfer member 70.

In detail, because a primary transfer voltage (primary transfer bias) having a polarity reversed to the charge polarity of the toner is applied to the primary transfer unit 60, a yellow toner image formed on the photosensitive member 20 is stuck to the intermediate transfer member 70 by the primary transfer voltage.

During this time, the secondary transfer unit 80 is kept apart from the intermediate transfer member 70.

By repeatedly performing the same process as that described above for the second, third and fourth color items, toner images having colors corresponding to respective image signals are transferred on top of one another onto the intermediate transfer member 70.

Thus, a full-color toner image is formed on the intermediate transfer member 70.

The recording medium P1, on the other hand, is conveyed from the paper feed tray 92 to the secondary transfer unit 80 by a paper feed roller 94 and a registration roller 96.

As the intermediate transfer member 70 rotates, a full-color toner image formed on the intermediate transfer member 70 reaches a secondary transfer position where the secondary transfer unit 80 is disposed.

At this position, the full-color toner image is transferred onto the recording medium P1 by the secondary transfer unit 80.

In detail, because a secondary transfer voltage (secondary transfer bias) is applied to the secondary transfer unit 80 while the secondary transfer unit 80 is pressed against the intermediate transfer member 70, a full-color toner image formed on the photosensitive member 20 is stuck and transferred to the recording medium P1 placed between the intermediate transfer member 70 and the secondary transfer unit 80 by the secondary transfer voltage.

The full-color toner image transferred to the recording medium P1 is heated and pressurized by the fixing unit 90 to be fusion bonded onto the recording medium P1.

Thus, a fixed toner image is obtained.

On the other hand, after the photosensitive member 20 passes the first transfer position, toner bonded to the surface of the photosensitive member 20 is shaved off by the cleaning blade 76 of the cleaning unit 75.

The photosensitive member 20 then prepares for charging for forming the next latent image. The toner shaved off is collected by remaining toner collection section (not shown) in the cleaning unit 75.

Developing Device

Next, the developing apparatus 51, 52, 53 and 54 of the developing unit 50 are described in detail.

These developing apparatus have approximately the same structure, and therefore the yellow developing apparatus 54 will be representatively described below with reference to FIG. 2.

The yellow developing apparatus 54 shown in FIG. 2 has a housing 540 to contain toner T, which is yellow toner, the developing roller 510 serving as a toner carrier, a toner supply roller 550 to supply the toner T to the developing roller 510, and a doctor blade 560 to regulate the layer thickness of the toner T carried on the developing roller 510.

The housing 540 contains the toner T in a containing section 530, which is formed as the interior space of the housing 540.

In the housing 540, the toner supply roller 550 and the developing roller 510 are brought into press contact with and rotatably held to each other in the opening and the neighborhood formed below in the containing section 530.

Attached to the housing 540 is the doctor blade 560, which is brought into pressure contact with the developing roller 510.

Further, attached to the housing 540 is a seal 520 for preventing leakage of toner from between the housing 540 and the developing roller 510 in the opening mentioned above.

The developing roller 510 holds (carries) the toner T on the circumference thereof, and provides the held toner T to the photosensitive member 20.

That is, this roller conveys the held toner T to the developing position that faces the photosensitive member 20.

The developing roller 510 is cylindrical and rotatable around the axis, and in the embodiment, rotates in the reverse direction to that of rotation of the photosensitive member 20.

In the embodiment, when toner is developed by the yellow developing apparatus 54, the developing roller 510 and the photosensitive member 20 face each other with a minute gap therebetween without being in contact with each other.

An alternate electric field is applied between the developing roller 510 and the photosensitive member 20 (hereinafter this state is referred to as an "electric field applied state").

As a result, the toner T is flown from the developing roller 510 to the photosensitive member 20 and a latent image on the photosensitive member 20 is developed.

The toner supply roller 550 supplies the toner T contained in the containing section 530 to the developing roller 510.

The toner supply roller 550 is made of polyurethane foam or the like and is in pressure contact with the developing roller 510 in a state of elastic deformation.

In the embodiment, the toner supply roller 550 rotates in the reverse direction to that of rotation of the developing roller 510.

The toner supply roller 550 not only has a function to supply the toner T contained in the containing section 530 to the developing roller 510, but also has a function to strip off the toner T remaining in the developing roller 510 after developing.

The doctor blade 560 regulates the layer thickness of the toner T carried by the developing roller 510, and provides the toner T carried by the developing roller 510 with electric charge by triboelectric (friction) charging during regulating.

The doctor blade 560 also functions as a seal positioned upstream from the developing position in the rotation direction of the developing roller 510.

The doctor blade 560 has a rubber portion 560*a* as a contact portion that is brought into contact along the axis direction of the developing roller 510 and a rubber support portion 560*b* as a support portion that supports the rubber portion 560*a*.

The rubber portion 560*a* is mainly made of silicon rubber, urethane rubber or the like, and a sheet-like thin plate having elasticity made of phosphor bronze, stainless steel or the like is used for the rubber support portion 560*b* because the rubber support portion 560*b* has a function to bias the rubber portion 560*a* toward the developing roller 510.

The rubber support portion 560*b* has one end thereof fixed to a blade support sheet metal 562. The blade support sheet metal 562 is attached to the housing 540, and the seal 520 is also attached to the housing 540.

Further, with the developing roller 510 mounted, the rubber portion 560*a* is pressed against the developing roller 510 by elastic force by warping of the rubber support portion 560*b*.

In the embodiment, a blade back portion 570 is disposed on the side of the doctor blade 560 that is reversed to the side of the developing roller 510.

This portion prevents the toner T from entering into between the rubber support portion 560*b* and the housing 540 while pressing the rubber portion 560*a* against the developing roller 510 to bring the rubber portion 560*a* into contact with the developing roller 510.

In the embodiment, a free end of the doctor blade 560, that is, an end remote from an end supported by the blade support sheet metal 562 comes into contact with the developing roller 510 at a portion slightly apart from the edge, not at the edge.

The doctor blade 560 is disposed such that the leading end is directed to the upstream in the direction of rotation of the developing roller 510.

In other words, the doctor blade 560 is in a counter direction to the direction of rotation of the developing roller 510.

Note that the structure, action and effect of each of the developing apparatus 51, 52 and 53 of the developing unit 50 are the same as those of the foregoing developing apparatus 54.

Developing Roller

Next, the developing roller 510 of the invention will be described in detail with reference to FIGS. 3 to 5.

Figure 3:
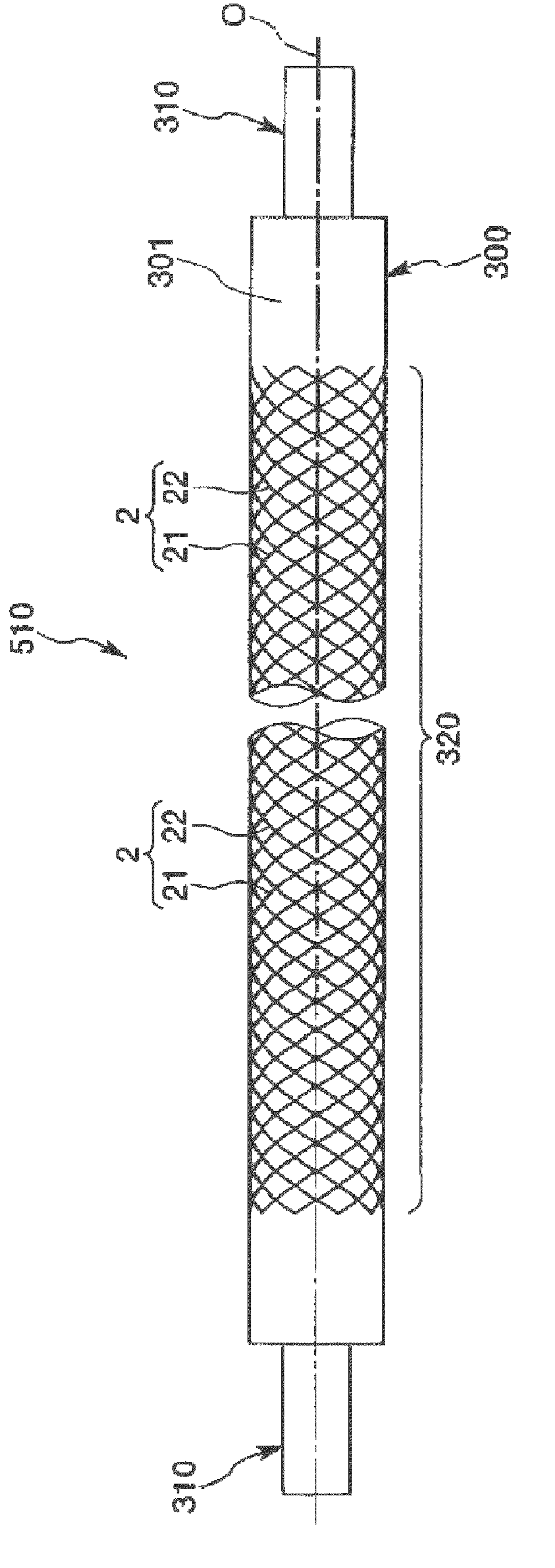
FIG. 3 is a plan view showing the schematic structure of a first embodiment of a developing roller of the invention.
Figure 4:
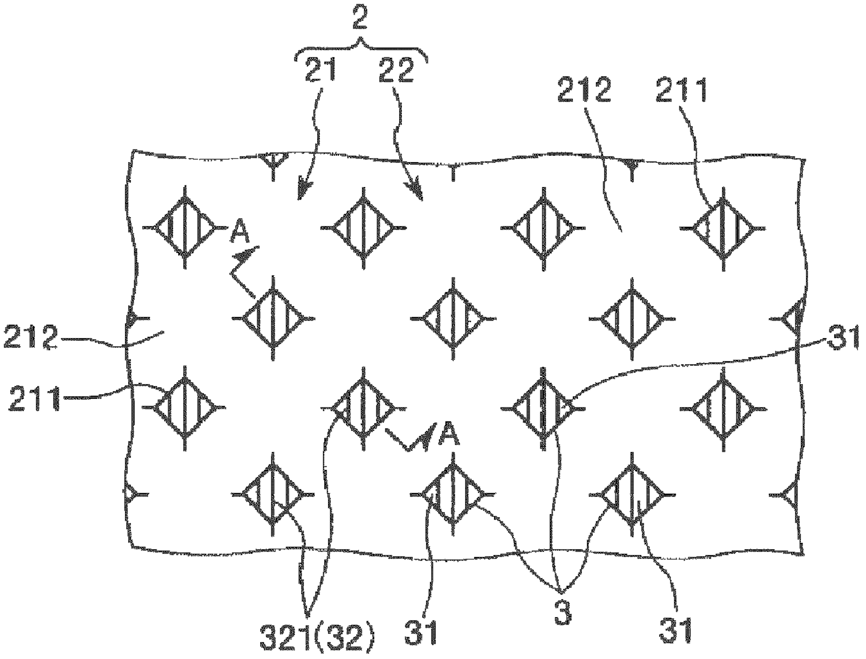
FIG. 4 is an enlarged plan view of a groove formed in the developing roller shown in FIG. 3.
Figure 5:
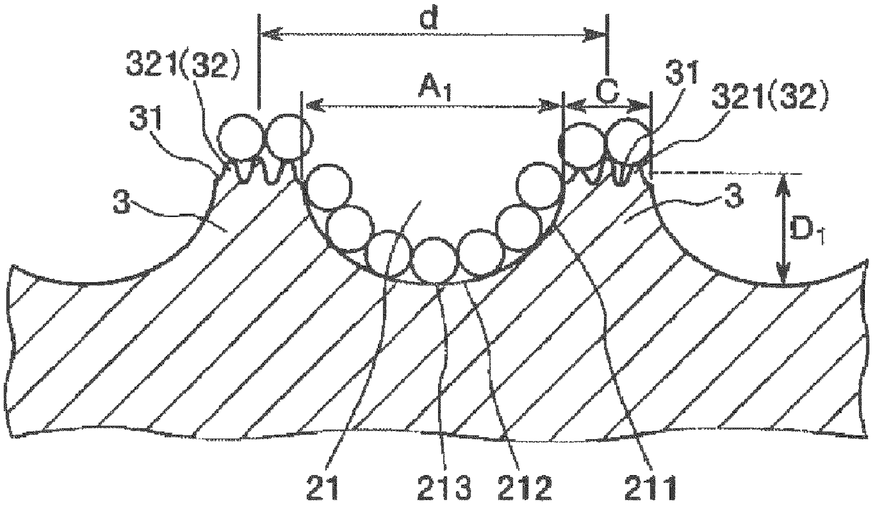
FIG. 5 is a cross-sectional view taken along the line A-A in FIG. 4.

FIG. 3 is a plan view showing the schematic structure of a developing roller, FIG. 4 is an enlarged plan view of a groove formed in the developing roller shown in FIG. 3, and FIG. 5 is a cross-sectional view taken along the line A-A in FIG. 4.

As shown in FIG. 3, the developing roller 510 includes a cylindrical main body 300 and reduced diameter portions 310 each having a reduced diameter from the outside diameter of the main body 300.

The reduced diameter portions 310 extend along the rotation axis (center axis) O of the main body 300 and protrude from both ends of the main body 300.

The main body 300 of the developing roller 510 is mainly made of a metal material such as aluminum, stainless steel or iron.

This allows a groove 2 to be formed easily and reliably in a circumferential portion 301 of the main body 300 (developing roller 510) e.g. by rolling (transfer method), which will be described later.

Conveying the toner T on the circumferential portion 301 of the main body 300 can effectively charge the toner T.

In addition, the circumferential surface 301*a* (circumferential portion 301) of the main body 300 may be plated with nickel, chrome or the like, as needed.

The diameter of the main body 300 is not particularly limited, but is preferably 10 to 30 nm, and more preferably 15 to 20 nm.

In the developing roller 510, the grooves 2 that particles of the toner T enter are formed in the circumferential portion 301 as shown in FIG. 3.

The grooves 2 consist of a plurality of first grooves 21 and a plurality of second grooves 22 that intersect the plurality of first grooves 21.

A protrusion portion 3 is formed in an area surrounded by each first groove 21 and each second groove 22.

As shown in FIG. 4, the plurality of first grooves 21 are parallel to each other, and are formed at approximately equal intervals, each in a direction inclined to the circumferential direction of the circumferential surface 301*a*.

As shown in FIG. 4, like the plurality of first grooves 21, the plurality of second grooves 22 are formed parallel to each other, and are formed at approximately equal intervals, each in a direction inclined to the circumferential direction of the circumferential surface 301*a*.

In the embodiment, the second grooves 22 are orthogonal to the first grooves 21 as shown in FIG. 4.

As shown in FIG. 5, particles of the toner T supplied from the toner supply roller 550 enter each first groove 21 and each second groove 22.

The toner T rolls in the first groove and the second groove to come into contact with and be rubbed by the developing roller 510.

Thus, toner is uniformly charged.

Since the shape of the first groove 21 is approximately the same as that of the second groove 22, hereinafter the first groove 21 will be representatively described.

The first grooves 21 are parallel to each other, and are formed at approximately equal intervals, each in a direction inclined to the circumferential direction of the circumferential surface 301*a*, as described above.

The toner T is therefore contained in the first groove 21, which allows an appropriate amount of toner T to be conveyed.

Here, the specific range of the average particle size of the toner T is preferably 1 to 10 μm, and more preferably 1 to 7 μm.

If the toner T having the average particle size in such a range is used, the toner T rolls smoothly on the circumferential surface 301*a* to be contained without piling up in the first groove 21.

The toner T is thus reliably and uniformly charged.

If the average particle size of the toner T is smaller than the lower limit, the toner T is contained while piling up in the first groove 21.

As a result, the toner T is nonuniformly charged.

On the other hand, if the average particle size of the toner T is greater than the upper limit, the toner T does not appropriately roll on the circumferential surface 301*a*.

As a result, the toner T may be insufficiently charged.

The maximum width $A_1$ of the first groove 21 is preferably 2.5 to 20 times, and more preferably 3 to 10 times the average particle size of the toner T.

Thus, the toner T is reliably contained in the first groove 21, which allows an appropriate amount of toner T to be conveyed.

Further, the contact surface of the particles of the toner T with the circumferential surface 301*a* of the developing roller 510 becomes larger.

As a result, the toner T is sufficiently charged.

If the maximum width $A_1$ of the first groove 21 is smaller than the above-mentioned lower limit of the average particle size of the toner T, the toner T may be not contained in the width of the first groove 21.

As a result, the toner T may be insufficiently charged.

A sufficient amount of toner T cannot be conveyed.

On the other hand, if the maximum width $A_1$ of the first groove 21 is greater than the above-mentioned upper limit of the average particle size of the toner T, a large amount of toner T may be contained in the first groove 21 to cause leakage of the toner T.

The surface of the toner T that is in contact with the circumferential surface 301*a* becomes smaller than the above-mentioned preferable range.

The toner T is insufficiently charged.

The maximum width $A_1$ of the first groove 21 is preferably 50 to 90%, and more preferably 60 to 80%, of the clearance d between protrusion portions 3 adjacent to each other.

With the width of the first groove 21 set in such a range, the ratio of the first groove 21 to the circumferential surface 301*a* increases.

Therefore, the toner T is contained in the first groove 21 to allow a sufficient amount of toner T to be conveyed.

Further, the protrusion portions 3 with dimension accuracy are formed, so that the contact surface of the particles of the toner T with the circumferential surface 301*a* of the developing roller 510 becomes larger.

Therefore, the toner T rolls on the circumferential surface 301*a* to be sufficiently charged.

As a result, high-quality printing to provide images with less fog can be achieved.

If the maximum width $A_1$ of the first groove 21 is smaller than the foregoing lower limit, it becomes difficult to contain the toner T in the first groove 21.

A sufficient amount of toner T cannot therefore be conveyed.

The toner T piles up in the first groove 21, and thus the toner T is nonuniformly charged.

On the other hand, if the maximum width $A_1$ of the first groove 21 is greater than the foregoing upper limit, a large amount of toner T may be contained in the first groove 21 to cause leakage of the toner T.

The contact surface of the particles of the toner T with the circumferential surface 301*a* becomes smaller than that in the foregoing preferable case.

Thus, the toner T is insufficiently charged.

The distance $D_1$ from the average line of the roughness of the top surface 31 to the deepest part 213 of the first groove 21 in the curve protrusion portion 3 (hereinafter referred to as a "depth $D_1$ of the first groove 21") is preferably 0.5 to 2 times, and more preferably 0.8 to 1.5 times, the average diameter of particles (average particle size) of the toner T.

If the distance $D_1$ is within such a range, the toner T can be contained without piling up in the first groove 21.

The toner T can be appropriately charged by coming into contact with the circumferential surface 301*a*.

As a result, high-quality printing to provide images with less fog can be achieved.

If the depth $D_1$ of the first groove 21 is smaller than the above-mentioned lower limit of the average diameter of particles (average particle size) of the toner T, the depth $D_1$ of the first groove 21 is shallow.

As a result, there is a possibility that the amount of conveyed toner T decreases.

As the ratio of the toner T to the circumferential surface 301*a* also decreases, the charging of the toner T may decrease.

On the other hand, if the depth $D_1$ of the first groove 21 is greater than the above-mentioned upper limit of the average diameter of particles (average particle size) of the toner T, it becomes difficult for the toner T to roll in the first groove 21.

Thus, the efficiency of conveying the toner T decreases and the toner T is insufficiently charged.

As far as the depth $D_1$ of the first groove 21 and the depth $D_2$ of the second groove 22 (distance $D_2$ from the average line of the roughness curve of the top surface 31 of the protrusion portion 3 to the deepest part of the second groove 22) satisfy the above-mentioned relationship with the average particle size of toner, the depth $D_1$ of the first groove 21 and the depth $D_2$ of the second groove 22 may satisfy a relationship of (the depth $D_1$ of the first groove 21)=(the depth $D_2$ of the second groove 22), may satisfy a relationship of (the depth $D_1$ of the first groove 21)>(the depth $D_2$ of the second groove 22), and may satisfy a relationship of (the depth $D_1$ of the first groove 21)<(the depth $D_2$ of the second groove 22).

In this embodiment, a relationship of $D_1=D_2$ is satisfied.

As a result, the circumferential surface 301*a* of the developing roller 510 has a smooth shape, and therefore the toner T can roll smoothly on the circumferential surface 301*a*.

The ratio $D_2/D_1$, that is the ratio of the depth $D_1$ of the first groove 21 to the depth $D_2$ of the second groove 22 is not particularly limited, but is preferably 0.5 to 2, and more preferably 0.8 to 1.5.

As a result, the circumferential surface 301*a* of the developing roller 510 has a smooth shape, and therefore the toner T can roll smoothly on the circumferential surface 301*a*.

As shown in FIG. 5, the first groove 21 has a U-shaped longitudinal section, and includes a side surface 211, a bottom surface 212 and a deepest part 213.

The toner T can roll smoothly due to the U-shaped longitudinal section.

The toner T comes into contact with the circumferential surface 301*a* of the developing roller 510, so that the toner T is uniformly charged.

As shown in FIG. 5, the U-shape of the first groove 21 is bilaterally symmetric.

Therefore, containing particles of the toner T into the first groove 21 and removing them therefrom proceed smoothly, allowing smooth conveyance of the toner T.

The toner T can thus be uniformly charged by coming into contact with the circumferential surface 301*a*.

The radius of curvature of the bottom surface 212 of the first groove 21 at this point is preferably greater than one-half of the average particle size of the toner T, and more preferably 0.6 to 10 times the average particle size of the toner T.

More specifically, the radius of curvature of the bottom surface 212 of the first groove 21 is preferably greater than 0.5 μm, and more preferably 0.6 to 50 μm.

Thus, the first groove 21 has such a shape as to facilitate rolling of particles of the toner.

The toner T comes in contact with the circumferential surface 301*a*, so that particles of the toner T are sufficiently charged.

If the radius of curvature of the bottom surface 212 of the first groove 21 is smaller than the foregoing lower limit, the toner T and is contained while piling up in the first groove 21.

As a result, the toner T is nonuniformly charged.

On the other hand, if the radius of curvature of the bottom surface 212 of the first groove 21 is greater than the foregoing upper limit, the toner T does not smoothly roll in the first groove 21.

As a result, the toner T is insufficiently charged.

The intervals between the first grooves 21 are approximately equal.

Specifically, the intervals are preferably within the length range of $C_1$, which will be described later.

If the intervals are within such a range, the first grooves 21 are formed at moderate intervals with the circumferential surface 301*a*.

This allows an appropriate amount of toner T to be conveyed.

The toner T can thus be uniformly charged by coming into contact with the circumferential surface 301*a*.

Therefore, high-quality printing to provide images with less fog can be achieved.

Regarding the area ratio of a part where the first grooves 21 are formed (hereinafter, a part where the groove 2 are formed will be referred to as a "groove formation section 320") to the circumferential surface 301*a* of the developing roller 510, the area of the groove formation section 320 is preferably 40 to 90%, and more preferably 60 to 80%, of the area of the circumferential surface 301*a*.

If the area ratio of the groove formation section 320 to the circumferential surface 301*a* is within the foregoing range, a more uniform and optimal amount of toner T can be conveyed.

The contact of the toner T with the developing roller 510 also increases, and therefore the toner T is sufficiently charged.

Thus, high-quality printing to provide images that have no irregularity and less fog can be achieved.

If the area ratio of the groove formation section 320 to the circumferential surface 301*a* is smaller than the foregoing lower limit, the surface area where the toner T is in contact with the circumferential surface 301*a* decreases, and therefore the toner T is insufficiently charged.

Further, the ratio of the groove 2 to the circumferential surface 301*a* becomes small, and therefore a sufficient amount of toner T cannot be conveyed.

On the other hand, if the area ratio of the groove formation section 320 to the circumferential surface 301*a* is greater than the foregoing upper limit, it suppresses rolling of particles from the first groove 21 to the protrusion portion 3.

As a result, the toner T is insufficiently charged.

The surface area where the toner T is in contact with the circumferential surface 301*a* becomes smaller than the foregoing preferable range.

As a result, the toner T is insufficiently charged.

The dimensions and shapes of portions of the second groove 22 are the same as those of the above-described first groove 21.

The actions and effects are also the same.

While the first groove 21 and the second groove 22 have approximately the same U-shape in FIG. 5, they may have different U-shapes.

For example, the first groove 21 and the second groove 22 may be semicircular and semielliptical, respectively.

The U-shape in some portions of the first groove 21 or the second groove 22 may differ from that in the other portions.

The protrusion portion 3 is formed in an area surrounded by the first groove 21 and the second groove 22, which is created by intersection of the first groove 21 and the second groove 22.

For example, as a result of forming a protrusion in such an area, the toner T located in the first groove 21 rolls toward the protrusion portion 3 and further is contained into the second groove 22 as the developing roller 510 rotates.

Accordingly, the contact of the toner T with the circumferential surface 301*a* of the developing roller 510 increases, and therefore the toner T is uniformly charged.

An appropriate amount of toner T can be conveyed by containing the toner T into the groove 2.

In the protrusion portion 3, the top surface 31 is an approximately flat surface, and minute projections 32 are formed on the flat surface.

The protrusion portion 3 as a whole is frustum-shaped.

As a result of forming the flat top surface 31, it becomes difficult for the surface to wear due to the friction with the toner T and a regulating blade.

The performance of the developing roller 510 can therefore be maintained for a long time.

Further, because the toner T rolls of on the top surface 31, the charging of the toner T can be improved.

Note that description on the minute projection 32 will be given later.

In this embodiment, the top surface 31 is formed in a approximately square shape as shown in FIG. 4.

Such the top surface 31 is obtained only by crossing the first groove 21 and the second groove 22 at right angles.

Therefore, the protrusion portion 3 having the top surface 31 of a approximately square shape can be easily obtained.

In addition, since the protrusion portion 3 is formed on the circumferential surface 301*a* of the developing roller 510, the top surface 31 is curved to approximately the same extent as that of the curvature radius of the outside diameter of the developing roller 510.

Being curved to this extent is defined to be included in the above-mentioned "approximately flat surface".

The size of the top surface 31 of the protrusion portion 3 is determined by the space interval between the first grooves 21 and by that between the second grooves 22.

Specifically, when the length of the top surface 31 that passes through the center of the top surface 31 of the protrusion portion 3 and is in a direction in parallel to the second groove 22 is $C_1$, $C_1$ is preferably 10 to 50 μm, and more preferably 10 to 30 μm.

Further, when the length of the top surface 31 that passes through the center of the top surface 31 of the protrusion portion 3 and is in a direction in parallel to the first groove 21 is $C_2$, $C_2$ is preferably 10 to 50 μm, and more preferably 10 to 30 μm.

If $C_1$ and $C_2$ are set in the above respective ranges, the top surface 31 has a moderate size.

The toner T therefore rolls on the top surface 31, allowing the toner T to be more efficiently charged.

If each of $C_1$ and $C_2$ is smaller than the above respective lower limit, it becomes easy for the protrusion to wear due to the friction with a regulating blade and toner caused by the long-time use.

Thus, a sufficient amount of toner conveyance and a sufficient amount of charging cannot be maintained.

On the other hand, if each of $C_1$ and $C_2$ is greater than the above respective upper limits, the area ratio of the groove 2 to the circumferential surface 301*a* decreases to cause leakage of the toner T.

The surface area of the toner T in contact with the circumferential surface 301*a* becomes smaller than the above preferable range.

Therefore, the toner T is insufficiently charged.

Note that the height of the protrusion portion 3 is the same as the depth $D_1$ of the first groove 21 and the depth $D_2$ of the second groove 22.

The clearance distance (pitch) d between the protrusion portions 3 adjacent each other is preferably 50 to 100 μm, and more preferably 60 to 90 μm.

By setting the clearance distance d within such a range, an appropriate amount of toner T can be conveyed as far as a moderate number of protrusion portions 3 exists on the circumferential surface 301*a* of the developing roller 510.

Therefore, the toner T efficiently rolls from the first groove 21 and/or the second groove 22 to the protrusion portion 3, and efficiently comes into contact with the circumferential surface 301*a* of the developing roller 510.

As a result, the toner T is sufficiently charged.

Further, the toner T remaining on the developing roller 510 after developing is excellently removed from the developing roller 510.

Additionally, the functions for serving as the developing roller, specifically good charging and conveyance performances, are good, and the balance between the functions and the durability to maintain the performances is excellent.

If the clearance distance d between the protrusion portions 3 adjacent each other is less than the foregoing lower limit, the charging performance increases.

However, if conditions such as groove widths ($A_1$ and $B_1$) are satisfied, the protrusion portion 3 has a reduced area, and therefore wears due to the friction.

As a result, the initial performances as the developing roller 510 cannot be maintained.

On the other hand, if the clearance distance d between the protrusion portions 3 adjacent each other is greater than the foregoing upper limit, the maximum width $A_1$ of the first groove 21 increases.

This increase may cause leakage of the toner T.

The surface area of the toner T in contact with the circumferential surface 301*a* becomes smaller than the above preferable range.

Therefore, the toner T is insufficiently charged.

As shown in FIGS. 4 and 5, a plurality of minute projections 32 are formed on the top surface 31 of each protrusion portion 3 in the invention.

In other words, the top surface 31 is rough.

When a surface roughness Rz (JIS B 0601) of the top surface 31 is Ro, Ro is preferably 0.5 to 2 times, and more preferably 0.7 to 1.5 times, the average particle size of the toner T.

By setting Ro within the foregoing range of the average particle size of the toner T, the toner T rolls while colliding with the projections 32 of the top surface 31.

Charging of the toner T can therefore be improved.

As a result, high-quality printing to provide images that have no irregularity and on which fog is suppressed can be achieved.

If Ro is smaller than the foregoing lower limit of the average particle size of the toner T, the toner T smoothly roles on the top surface 31.

Therefore, the toner T may not be sufficiently charged.

On the other hand, if Ro is larger than the foregoing upper limit of the average particle size of the toner T, it becomes difficult for the toner T to smoothly role on the top surface 31.

Therefore, the toner T is not sufficiently charged. This may lead to increasing fog.

The specific size of Ro is preferably 0.5 to 20 μm, and more preferably 1 to 14 μm.

By setting the size of Ro within such a range, the toner T rolls while colliding with the projection 32 of the top surface 31.

Charging of the toner T can therefore be improved.

As a result, high-quality printing to provide images that have no irregularity and on which fog is suppressed can be achieved.

If the size of Ro is smaller than the foregoing lower limit, the toner T smoothly roles on the top surface 31.

Therefore, the toner T may be not sufficiently charged.

On the other hand, if Ro is larger than the foregoing upper limit, it becomes difficult for the toner T to roll on the top surface 31.

The toner T is therefore not charged sufficiently. As a result, this may lead to increasing fog.

The surface roughness Ro of the top surface 31 as described above is the same in the groove formation section 320 as a whole of the main body 300 of the developing roller 510, but may partially vary along the longitudinal direction of the main body 300.

In this embodiment, description will be given on the understanding that the surface roughness Ro of the top surface 31 is the same in the groove formation section 320 as a whole.

The case of altering the surface roughness Ro will be described in detail in a third embodiment.

The surface roughness Ro of the top surface 31 must satisfy a relation of $Ro<D_1$ and $Ro<D_2$.

If such a relation is satisfied, $D_1$ and $D_2$ are each uniform.

The toner T surely rolls from the groove 2 to the protrusion portion 3, and from the protrusion portion 3 to the groove 2.

The toner T is sufficiently charged.

On the other hand, if Ro is greater than $D_1$ and greater than $D_2$, $D_1$ and $D_2$ are each nonuniform.

It therefore becomes difficult for the toner T to roll on the circumferential surface 301*a* of the developing roller 510.

This may reduce the charging of the toner T.

The minute projections 32 formed on the top surface 31 of each protrusion portion 3 extend along the circumferential direction of the circumferential surface 301*a* of the developing roller 510 as shown in FIG. 4, but may be inclined to the circumferential direction.

A plurality of protrusions 321 are formed in approximately parallel to each other.

The intervals therebetween are approximately equal.

One protrusion 321 has such a length in the longitudinal direction as to cross the whole top surface 31 of the protrusion portion 3 as shown in FIG. 4.

However, the protrusion 321 may be formed intermittently with a shorter longitudinal length.

In addition, the number of the protrusions 321 on the top surface 31 of the protrusion portion 3 is not limited to being plural, but may be one.

The minute projection 32 is not limited to being in the form of protrusion 321, but may be formed in a scattered manner.

Forming as the projection 32 the protrusion 321 as described above reduces a variation of the surface roughness Ro of the top surface 31 in each protrusion portion 3.

The toner T can always have a constant performance and be uniformly charged by rolling on the circumferential surface 301*a* of the developing roller 510.

For example, the protrusion 321 can be easily formed by centerless grinding with a roller base material 400 rotating, as described later.

The surface roughness of the inner surface (the side surface 211, the bottom surface 212) of the first groove 21 is less than the surface roughness Ro of the top surface 31 of the protrusion portion 3.

Specifically, when the surface roughness Rz (JIS B 0601) of the inner surface of the first groove 21 is $R_1$, $R_1$ is preferably 0.01 to 10 μm, and more preferably 0.1 to 1 μm.

By setting $R_1$ in such a range, the toner T smoothly role in the first groove 21, which makes it easy for the toner T to be contained into the first groove 21 and the second groove 22 and to be removed from therefrom.

In this embodiment, the inner surface of the first groove 21 is smooth as shown in FIG. 5.

The area ratio of the top surface 31 having the surface roughness Ro that satisfies the above-described relation to the circumferential surface 301*a* of the developing roller 510 is not particularly limited, but the area of such top surfaces 31 is preferably 50 to 100%, and more preferably 60 to 100%, of the area of the top surfaces 31 of all the protrusion portions 3.

If the area ratio the top surfaces 31 having the surface roughness Ro that satisfies the above-described relation is large, the above-described effects caused by providing the top surface 31 of the protrusion portion 3 with the minute projections 32 are fully expressed.

As described above, the developing roller 510 of the invention has the first groove 21 and the second groove 22 intersecting each other, and therefore can contain and convey the toner T.

In this case, the first groove 21 and the second groove 22 have U-shaped longitudinal sections that are bilaterally symmetric.

Because of this, rolling of the toner T smoothly proceeds such that the toner T is removed from the groove 2.

The removed toner T reaches the top surface 31 of the protrusion portion 3, and rolls while colliding with the projection 32 (protrusion 321) on the top surface 31 to be contained into the groove 2 again.

Thus, the toner T rolls while colliding with the protrusion 321 without piling up in the groove 2, and therefore the toner T can be uniformly and sufficiently charged.

As a result, high-quality printing to provide images that have no irregularity and less fog can be achieved.

Method for Manufacturing Developing Roller

FIGS. 6A to 6C, FIGS. 7A to 7D, FIG. 8 and FIG. 11 are views for explaining one example of processes of a method for manufacturing a developing roller shown in FIG. 3.

Figure 6A:
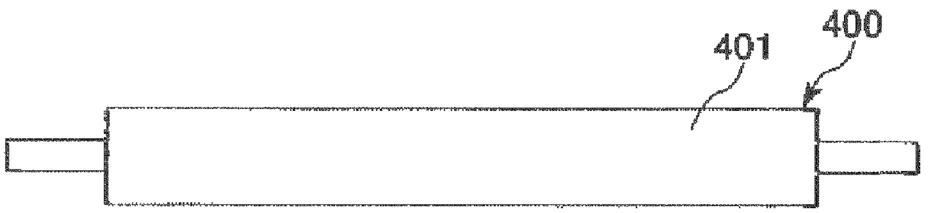
FIGS. 6A to 6C are views for explaining one example of processes of a method for manufacturing the developing roller shown in FIG. 3.
Figure 6B:
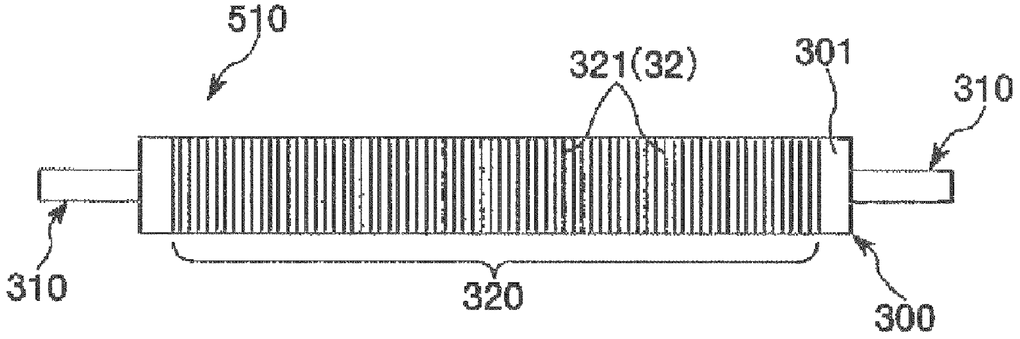
Figure 6C:
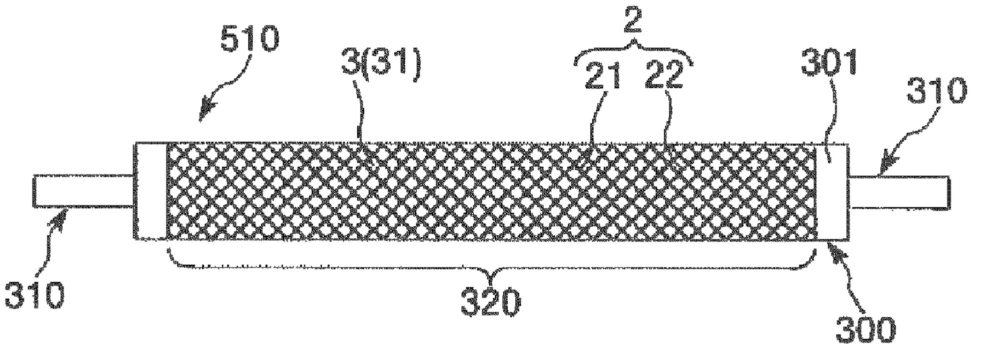
Figure 11:
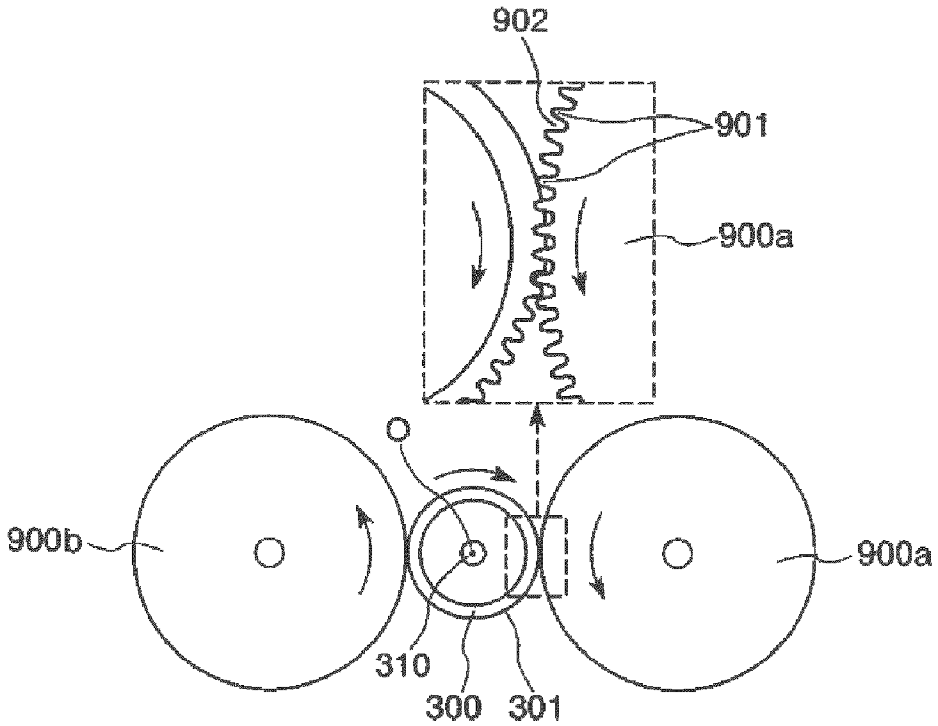
FIG. 11 is a view for explaining a form rolling process of a method for manufacturing a developing roller of the invention.

FIGS. 6A to 6C are plan views, FIGS. 7A to 7D and FIG. 8 are sectional views, and FIG. 11 is a side view.

Note that hereinafter the upper side and the lower side in FIGS. 7A to 7D and FIG. 8 will be referred to as "above" and "below", respectively.

The method for manufacturing a developing roller includes a first process of forming a large number of minute projections by roughening the circumferential surface of a cylindrical roller base material; and a second process of forming by form rolling a plurality of first grooves disposed in parallel to each other on the circumferential surface of the roughened roller base material at approximately equal intervals, each in a direction inclined to the circumferential direction of the circumferential surface of the roller base material, and a plurality of second grooves, each of which intersects each of the plurality of first grooves, disposed in parallel to each other at approximately equal intervals, each in a direction inclined to the circumferential direction of the circumferential surface of the roller base material.

A method of forming the developing roller 510 of the invention will be described in detail below.

[1] First Process

Figure 7A:
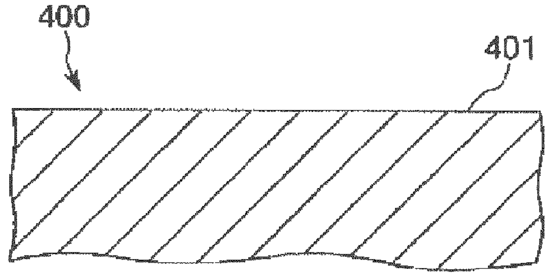
FIGS. 7A to 7D are views for explaining one example of processes of the method for manufacturing the developing roller shown in FIG. 3.

First, as shown in FIGS. 6A and 7A, the roller base material 400 to be the main body 300 of the developing roller 510 is prepared.

Figure 7B:
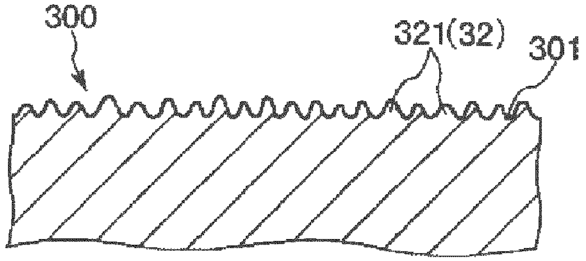

Next, as shown in FIGS. 6B and 7B, a circumferential surface 401 of the roller base material 400 is roughened (processing for formation of the projection 32) to fabricate the main body 300.

As examples of the roughening of the circumferential surface 401 of the roller base material 400, various mechanical processing such as grinding e.g. centerless grinding, polishing, blasting, transfer and dry etching; various chemical treatments such as wet etching and electrolysis treatment; and other processing such as electric discharge machining, plasma machining and laser machining are mentioned.

One kind or two kinds or more in combination among the mentioned processing can be used for roughening.

Among the mentioned processing, it is preferable to use centerless grinding and blasting.

If centerless grinding is used, because the roller base material 400 is grinded while being rotated, the protrusion 321 can be easily and accurately formed.

Also, because the roller base material 400 does not require a center hole, mounting to a grinder or the like is not required. Thus, the material can be easily grinded.

Further, because the whole roller base material 400 is supported, resulting in less deflection due to grinding force.

Thus, the grinding accuracy can be kept constant.

If blasting is used, because the projection 32 is formed just by spraying abrasive grains, the material can be efficiently roughened.

Because the effects of blasting can be changed with changes of the kind of abrasive grain and the grain size, a desired surface roughness Ro can be achieved by appropriately changing the kind and size of grain.

Further, if blasting is used, the circumferential surface 401 of the roller base material 400 has a small variation in surface roughness.

If a surface is roughened by centerless grinding or blasting, the procedures are as follows:

A. Use of Centerless Grinding for Surface Roughening

The roller base material 400 shown in FIGS. 6A and 7A is roughened using a centerless grinder.

As a result, the protrusions 321, which are projections 32, are formed on the circumferential surface 401 of the roller base material 400 as shown in FIGS. 6B and 7B.

For example, centerless grinding can be performed using a centerless grinder having a support blade for supporting the roller base material 400, a regulating wheel for regulating the rotation of the roller base material 400, and a grinding wheel for grinding the circumferential surface 401 of the roller base material 400.

Specifically, in centerless grinding, the roller base material 400 is placed in the centerless grinder.

With the grinding wheel in contact with the roller base material 400, the circumferential surface 401 of the roller base material 400 is ground while the rotation and feed of the roller base material 400 are being regulated by the regulating wheel.

The protrusions 321 are thus formed on the whole or part of the circumferential surface 401.

If two kinds of grinding wheels that differ from each other in roughness are used at positions corresponding to the end portion and the intermediate portion of the roller base material 400, the roller base material 400 can be ground such that the surface roughness differs between the end portion and the intermediate portion.

B. Use of Blasting for Surface Roughening

The roller base material 400 shown in FIGS. 6A and 7A is roughened by blasting.

Thus, minute projections 32 are formed on the circumferential surface 401 of the roller base material 400 as shown in FIGS. 6B and 7B.

For example, blasting can be performed using a blasting machine having a nozzle for ejecting abrasive grains, a grain tank for storing abrasive grains, a classifier for classifying the grain sizes of abrasive grains, and gas supply means for supplying carrier gas together with abrasive grains ejected from the nozzle.

Specifically, blasting ejects abrasive grains of alumina, silicon carbide, diamond and the like together with carrier gas such as compressed air toward the circumferential surface 401 of the roller base material 400 to roughen the circumferential surface 401.

The whole of the circumferential surface 401 is roughened by properly combining the rotation of the roller base material 400 with the scan of a nozzle.

The minute projections 32 are thus formed on the whole or part of the circumferential surface 401.

If abrasive grains that differ from each other in grain size are used at the end portion and the intermediate portion of the roller base material 400, the surface of the roller base material 400 can be roughened such that the surface roughness differs between the end portion and the intermediate portion.

By the process for roughening a surface as described above, the circumferential surface 401 of the roller base material 400 is roughened and thus the developing roller 510 with the protrusions 321 thereon as shown in FIGS. 6B and 7B is obtained.

[2] Second Process

[2-1] Preparation of Rolling Dies (Rolling Device)

Figure 7C:
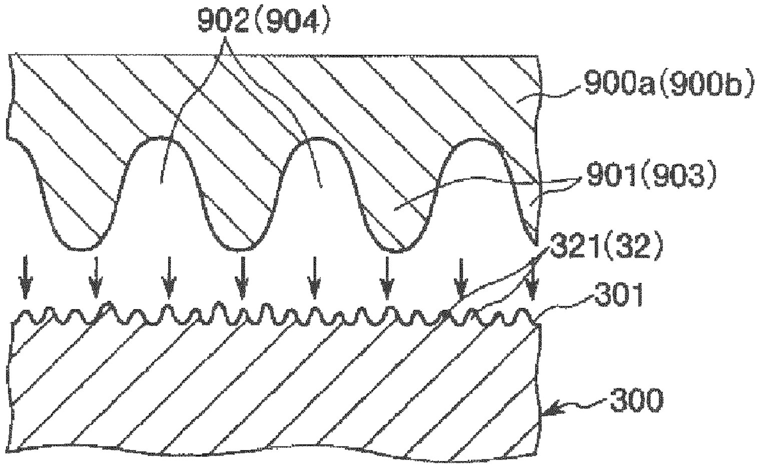

Next, as shown in FIGS. 7C and 11, a die (roller) 900*a* for form rolling of the first grooves 21 and a die (roller) 900*b* for form rolling of the second grooves 22 are prepared to the circumferential surface 301*a* of the main body 300, on which the protrusions 321 are formed, so as to form the first grooves 21 and the second grooves 22.

In the die 900*a*, protrusions 901 corresponding to the first grooves 21 are formed. On the other hand, in the die 900*b*, protrusions 903 corresponding to the second grooves are formed.

Grooves 902 and 904 are formed in the dies 900*a* and 900*b*, respectively, such that the maximum depth of the grooves is greater than the height of the protrusion portion 3 (the depth $D_1$ of the first groove 21 and the depth $D_2$ of the second groove 22).

The dies 900*a* and 900*b* are not pressed against the top surface 31 of the protrusion portions 3 while being pressed against the main body 300.

Thus, the protrusions 321 can remain on the top surface 31.

[2-2] Form Rolling of First Groove and Second Groove

Figure 7D:
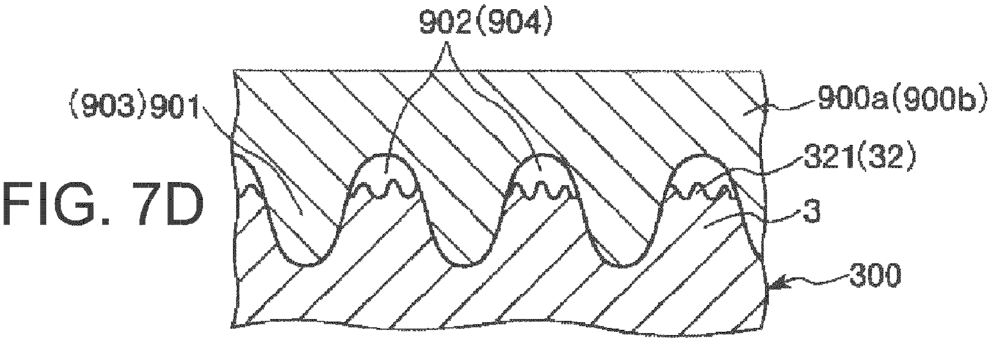

Next, as shown in FIGS. 7D and 11, the dies 900*a* and 900*b* are pressed against the main body 300.

Specifically, the dies 900*a* and 900*b* are pressed against the main body 300 such that the grooves 902 and 904 of the dies 900*a* and 900*b* are not brought into contact with the protrusions 321 on the top surfaces 31 of the protrusion portions 3 so as to form the first grooves 21 and the second grooves 22 by form rolling.

For example, form rolling can be performed using a rolling device having the die 900*a* for producing the first grooves 21 by form rolling, the die 900*b* for producing the second grooves 22 by form rolling, and rotation means (not shown) for rotating the dies, as shown in FIG. 11.

Specifically, roller base material 400 (main body 300) with the roughened surface is held (sandwiched) between the die 900*a* and the die 900*b*.

While the die 900*a* and the die 900*b* are rotated in the same direction, the main body 300 is rotated in the reversed direction to that of the die 900*a* and the die 900*b*.

As the die 900*a* and the main body 300 rotate, the protrusions 901 of the die 900*a* are pressed against the main body 300 as shown in FIGS. 7D and 11.

According to this pressing, the circumferential surface 301*a* of the main body 300 is deformed.

The first grooves 21 are thus produced by form rolling.

On the other hand, as the die 900*b* and the main body 300 rotate, the protrusions 903 of the die 900*b* are pressed against the main body 300 as shown in FIGS. 7D and 11.

According to this pressing, the circumferential surface 301*a* of the main body 300 is deformed.

The first grooves 22 are thus produced by form rolling.

Formation of the second grooves 22 lags behind (or ahead of) formation of the first grooves 21 by a half cycle.

When the main body 300 rotates approximately once, the first grooves 21 and the second grooves 22 are formed overlapping each other (intersecting each other), so that a developing roller shown in FIG. 6C is obtained.

At this point, portions at the maximum depth of the grooves 902 and 904 of the dies 900*a* and 900*b* are not in contact with the roughened circumferential surface 301*a* of the main body 300, leaving the protrusions 321 intact.

After the form rolling, the main body 300 is removed from the rolling device.

Figure 8:
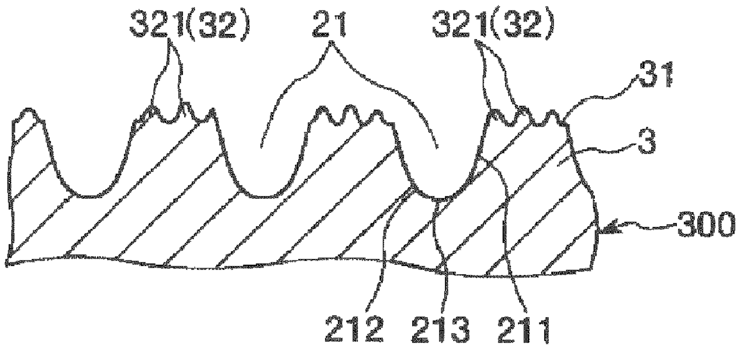
FIG. 8 is a view for explaining one example of processes of the method for manufacturing the developing roller shown in FIG. 3.

Through the above-described processes, the first and second grooves 21 and 22 and the protrusion portions 3 with the remaining protrusions 321 on the top surfaces 31 are formed in the main body 300 as shown in FIG. 8.

By form rolling with the main body 300 sandwiched between the die 900*a* and the die 900*b*, and particularly by forming the first grooves 21 and the second grooves 22 using the separate dies 900*a* and 900*b*, uniform, but not excessive pressure is applied to the main body 300.

The first grooves 21 and the second grooves 22 can thus be efficiently and accurately formed.

In addition, the rolling device may include means (not shown) for regulating the center distance between the rotation shaft of the die 900*a* and the rotation shaft O of the main body 300 and the center distance between the rotation shaft of the die 900*b* and the rotation shaft O of the main body 300.

If the center distances are too short, the dies 900*a* and 900*b* are excessively pressed against the main body 300.

This may make the top surface 31 of the protrusion portion 3 smaller than the designed value, or make the top surface 31 smooth.

On the other hand, if the center distances are too long, the force by which the dies 900*a* and 900*b* are pressed against the main body 300 decreases.

This may make the top surface 31 of the protrusion portion 3 larger than the designed value, or the depth $D_1$ of the first groove and the depth $D_2$ of the second groove smaller than the designed values.

Therefore, to form the top surface 31 that meets the above-described conditions, the foregoing regulating means is preferably provided.

Providing the regulating means allows the first and second grooves 21 and 22 with moderate depths and the protrusions 321 on the top surfaces 31 of the protrusion portions 3 to be formed in a reliable and well reproducible way.

Regarding the dies 900*a* and 900*b* described above, the protrusions 901 corresponding to the first grooves 21 and the protrusions 903 corresponding to the second grooves 22 are separately formed in the die 900*a* and the die 900*b*, respectively, but this is not limitative.

For example, the protrusions 901 and 903 corresponding to the first grooves 21 and the second grooves 22 may be formed in the die 900*a*.

Second Embodiment

Figure 9:
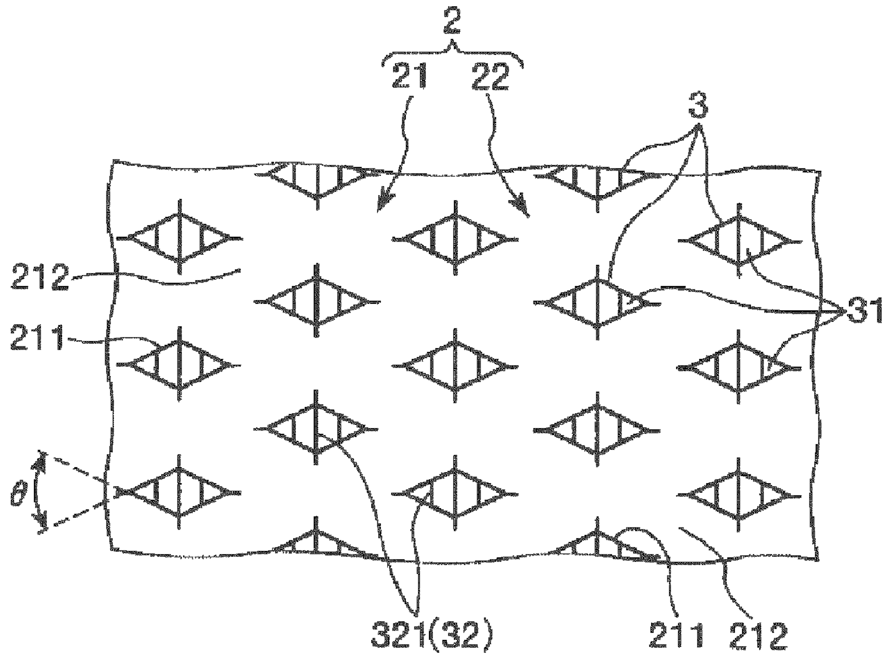
FIG. 9 is an enlarged plan view showing a groove formed in a developing roller of a second embodiment of the invention.

FIG. 9 is an enlarged plan view of the groove 2 formed in the developing roller 510.

A second embodiment of the developing roller 510 of the invention will be described below with reference to this drawing.

Description will be given mainly on differences from the above embodiment, and explanation on the same elements as those of the above embodiment will be omitted.

This embodiment differs from the first embodiment in the shape of the protrusion portion 3 and the crossing angle between the first groove 21 and the second groove 22.

As shown in FIG. 9, the top surface 31 of the protrusion portion 3 is of a approximately planar, rhombic shape.

That is, the plurality of first grooves 21 and the plurality of second grooves 22 intersect each other, but do not intersect at right angles.

The angle θ in this case at which the first groove 21 and the second groove 22 intersect each other is preferably 20 to 135°, and more preferably 45 to 90°.

Setting the crossing angle of the first groove 21 and the second groove 22 at a value in such a range provides the rhombus-shaped top surface 31, and increases the number of protrusion portions 3 along the circumferential direction of the developing roller 510.

Therefore, the toner T rolls while colliding with the protrusion portions 3 more often than in the first embodiment (in the case of crossing at right angles).

Thus, the toner T can be more efficiently brought into contact with the circumferential surface 301*a* of the developing roller 510, and is more sufficiently charged.

As a result, high-quality printing to provide images with less fog can be achieved.

Thus, high-quality printing to provide images that have no irregularity and less fog can be achieved.

Note that the conditions of the minute projection 32 are the same as those described in the first embodiment.

Third Embodiment

Figure 10:
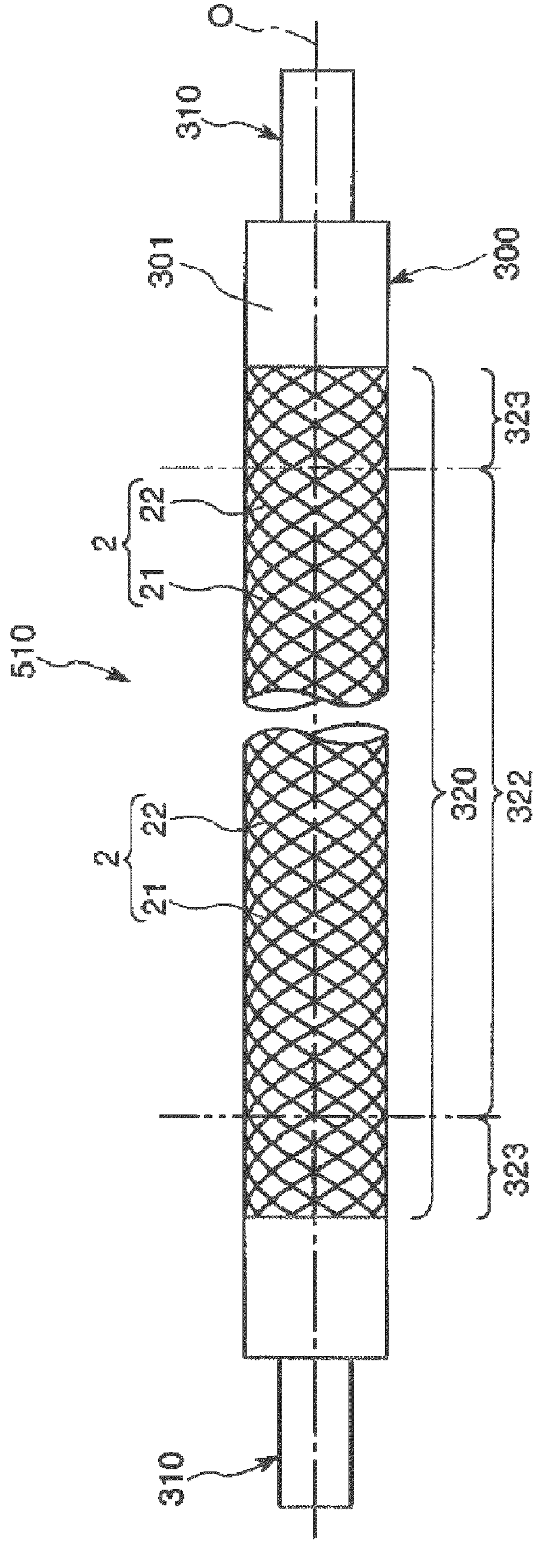
FIG. 10 is a plan view showing a schematic structure of a third embodiment of the developing roller of the invention.

FIG. 10 is a plan view showing a schematic structure of the developing roller 510.

A third embodiment of the developing roller 510 of the invention will be described below with reference to this drawing.

Description will be given mainly on differences from the above embodiments, and explanation on the same elements as those of the above embodiments will be omitted.

This embodiment is the same as the first embodiment except that the surface roughness $R_O$ of the top surfaces 31 of the protrusion portions 3 partially varies along the longitudinal direction of the main body 300.

In other words, while the surface roughness $R_O$ of the top surface 31 of the protrusion portion 3 is the same for the whole of the groove formation section 320 in the first embodiment, the surface roughness $R_O$ of the top surface 31 located at an end portion 323 of the groove formation section 320 of the main body 300 is smaller than that of the top surface 31 located at a center portion 322 of the groove formation section 320 in this embodiment.

Specifically, the surface roughness $R_O$ of the top surface 31 located at the end portion 323 of the groove formation section 320 of the main body 300 is preferably 50 to 90%, and more preferably 60 to 80%, of the surface roughness $R_O$ of the top surface 31 located at the center portion 322 of the groove formation section 320.

Since a more amount of toner T rolls in the center portion 322 of the developing roller 510, the surface roughness $R_O$ of the top surface 31 located at the end portion 323 of the groove formation section 320 is smaller than that of the top surface 31 located at the center portion 322 of the groove formation section 320.

This can more efficiently improve charging of the toner T.

As described above, the surface roughness $R_O$ of the top surface 31 of the protrusion portion 3 at the end portion 323 in the main body 300 of the developing roller 510 may differ from that at the center portion 322.

However, the surface roughness $R_O$ of the top surface 31 may differ for each protrusion portion 3.

For example, the surface roughness $R_O$ of the top surface 31 may differ for every other protrusion portion 3 in the longitudinal direction.

Part of the circumferential surface 301*a* of the main body 300 and the top surfaces 31 of some protrusion portions 3 need not be roughened.

Note that the surface roughness $R_O$ of the top surface 31 located at the end portion 323 is smaller than that of the top surface 31 located at the center portion 322 in this embodiment.

However, this surface roughness $R_O$ meets the conditions of the surface roughness described in the first embodiment.

While the developing apparatus and the image forming apparatus of the invention have been described on the embodiments with reference to the accompanying drawings, the invention is not limited to the above embodiments.

Components constituting the developing apparatus and the image forming apparatus can be replaced by ones having arbitrary structures that can fulfill the same functions.

Arbitrary constituents may be added.

Further, the developing apparatus and the image forming apparatus of the invention may be composed of two or more arbitrary structures (features) in combination with each other in the above embodiments.

Part of the roughened top surface of the protrusion portion needs not meet the conditions explained in the first embodiment.

In the following, the invention will be described based on examples, but the invention is not limited to the examples.

EXAMPLES

1. Manufacturing Developing Device

First Example

[1. 1] Manufacturing Developing Roller

[1. 1. 1] Centerless Grinding

A cylindrical roller base material formed of a carbon steel tube for machine structural purposes STKM11A having a length of 314.5 mm and a diameter of 18 mm is set in a centerless grinder (MD600III-4W made by Mikron Holding AG).

This centerless grinder uses grindstones that differ each other in roughness at positions of grinding wheels corresponding to an end portion and an intermediate portion of a roller base material to be ground.

The grindstones of the centerless grinder came into contact with the roller base material.

The centerless grinder ground the circumferential surface of the roller base material for 10 seconds while rotating the roller base material at a rotational speed of 30 rpm.

As a result, the whole circumferential surface of the roller base material was roughened to form protrusions.

At this point, the surface roughness $R_O$ of the intermediate portion, and the surface roughness of the end portion, of the circumferential surface of the roller base material were 5.9 μm and 2.4 μm, respectively.

[1. 1. 2] Form Rolling of First and Second Grooves

A die in which protrusions corresponding to first grooves are formed and a die in which protrusions corresponding to second grooves were prepared.

Next, the roller base material (main body) with the surface roughened, which was obtained in [1. 1. 1] was set in a rolling device (ND-10/CNC made by Nissei Co., Ltd.).

The two dies were pressed against the main body for 14 seconds while the dies and the main body rotated in opposite directions at a rotational speed of 150 rpm to produce the first grooves and the second grooves in the main body by form rolling.

After form rolling, the dies and the main body stopped rotating, and the main body was removed from the rolling device.

As a result, the first grooves, the second grooves intersecting the first grooves at an angle of 90°, and protrusion portions with protrusions remaining on the top surface were formed on the circumferential surface of the main body.

Regarding the first and second grooves and the protrusion portions formed on the circumferential surface of the main body, the maximum width $A_1$ of the first groove was 40 μm, the depth $D_1$ of the first groove was 6.5 μm, the maximum width $A_2$ of the second groove was 40 μm, the depth $D_2$ of the second groove was 6.5 μm, and the groove pitch (protrusion portion pitch) was 80 μm.

The top surface of the protrusion portion was a plane surface of 40 μm×40 μm.

[1. 1. 3] Electroless NiP Plating

Next, the developing roller with the formed first and second grooves was immersed in a degreasing liquid, and was degreased at 60° C. for 5 minutes.

After decreasing, the degreased developing roller was immersed in a NiP plating liquid (NIMUDEN SX made by C. Uyemura & Co., Ltd.), and electroless plating was applied to the immersed developing roller at 80° C. for 1 minute.

After the obtained developing roller was cleaned and dried, a NiP layer having a film thickness of 4 μm was formed on the circumferential surface of the developing roller.

At this point, the surface roughness $R_O$ of the top surface of the protrusion portion was 5.8 μm, and the deflection of the main body of the developing roller was 3 μm.

The surface roughnesses R1 of the inner surfaces of the first and second grooves were 0.5 μm.

Thus, the developing roller having a structure shown in FIG. 3, which had on the circumferential surface of the developing roller the first and second grooves and protrusion portions with protrusions remaining on the top surfaces, was manufactured.

Note that the surface roughness $R_O$ of the top surface of the protrusion portion after plating, the distance $D_1$ from the average line of the roughness curve of surface roughness $R_O$ to the deepest part of the first groove, the distance $D_2$ from the average line of the roughness curve of surface roughness $R_O$ to the deepest part of the second groove, and the protrusion portion pitch (d) and other conditions were shown in Table 1.

[1. 2] Manufacturing Developing Device

A developing apparatus having a structure shown in FIG. 2, in which this developing roller was incorporated, was manufactured.

[1. 3] Manufacturing Image Forming Apparatus

An image forming apparatus having a structure shown in FIG. 1, in which this developing apparatus was incorporated, was manufactured.

Second to Fourteenth Examples

Processes were performed in the same way as in the first example except that the conditions of the developing roller such as $R_O$, $D_1$, $D_2$ and d were changed into those shown in Table 1, thereby manufacturing an image forming apparatus.

Fifteenth Example

[1. 1] Manufacturing Developing Roller

[1. 1. 1] Blasting

A cylindrical roller base material formed of a carbon steel tube for machine structural purposes, STKM11A, having a length of 314.5 mm and a diameter of 18 mm was set on a stage.

Next, abrasive grains were ejected (pressures of 0.35 to 0.45 Mpa) from a nozzle of a blasting machine (SGM-5GTJ-DC-303, 12×12, made by Fuji Manufacturing Co., Ltd.) to the roller base material while the roller was rotated at 12 rpm.

The whole circumferential surface of the roller base material was thus roughened.

In addition, zirconia having an average grain size of 125 μm was used for the abrasive grains, and air was used for the carrier gas.

As a result, the whole circumferential surface of the roller base material was roughened, so that a plurality of minute projections were formed.

At this point, the surface roughness $R_O$ of the circumferential surface of the roller base material was 6.2 μm.

[1. 1. 2] Form Rolling of First and Second Grooves

The first and second grooves were produced by form rolling in the same way as in the first example.

Note that the maximum width $A_1$ of the first groove, the depth $D_1$ of the first groove, the maximum width $A_2$ of the second groove, the depth $D_2$ of the second groove, the groove pitch (protrusion portion pitch) and the size of the top surface of the protrusion portion were the same as those in the first example.

[1. 1. 3] NiP Plating

Next, NiP plating was applied in the same way as in the first example to the developing roller with the formed first and second grooves.

Note that the film thickness of NiP was 4 μm.

At this point, the surface roughness $R_O$ of the top surface of the protrusion portion was 6.1 μm, and the surface roughness R1 of the inner surface of each of the first groove and the second groove was 0.55 μm.

As described above, a developing roller having a structure shown in FIG. 3, which had on the circumferential surface of the developing roller the first and second grooves and protrusion portions with protrusions remaining on the top surfaces, was manufactured.

Note that the surface roughness $R_O$ of the top surface of the protrusion portion after plating, the distance $D_1$ from the average line of the roughness curve of surface roughness $R_O$ to the deepest part of the first groove, the distance $D_2$ from the average line of the roughness curve of surface roughness $R_O$ to the deepest part of the second groove, and the protrusion portion pitch (d) and other conditions were shown in Table 1.

[1. 2] Manufacturing Developing Device

Processes were performed in the same way as in the first example, so that a developing apparatus having a structure shown in FIG. 2, in which a developing roller obtained in [1. 1] was incorporated, was manufactured.

[1. 3] Manufacturing Image Forming Apparatus

Processes were performed in the same way as in the first example, so that an image forming apparatus having a structure shown in FIG. 1, in which a developing apparatus obtained in [1. 2] was incorporated, was manufactured.

Sixteenth and Eighteenth Examples

Processes performed in the fifteenth example were performed in the same way as in the fifteenth example except that the conditions of the developing roller such as $R_O$, $D_1$, $D_2$ and d were changed into those shown in Table 1, thereby manufacturing an image forming apparatus.

Nineteenth Example

Blasting performed in [1. 1. 1] blasting of the fifteenth example was performed in the same way as in the fifteenth example with the average particle size of abrasive grains changed into 100 μm.

As a result, the surface roughness $R_O$ of the circumferential surface of the roller base material was 3.8 μm.

Then, the roller base material with the roughened surface was immersed in an electrolyte containing 10% sulfuric acid, and an electrolysis treatment was applied to the roller base material at 40° C. for 1 minute so that the circumferential surface of the roller base material was finished to be smooth.

As a result, the surface roughness $R_O$ of the circumferential surface of the roller base material was 3.3 μm.

Subsequent processes were performed in the same way as in the fifteenth example, and thus an image forming apparatus was manufactured.

Note that the surface roughness $R_O$ of the top surface of the protrusion portion after plating was 3.3 μm.

First Comparative Example

Processes performed in the first example were performed in the same way as in the first example except that centerless grinding was not performed, thereby manufacturing an image forming apparatus.

Second to Tenth Comparative Examples

Processes performed in the first example were performed in the same way as in the first example except that the conditions of the developing roller such as $R_O$, $D_1$, $D_2$ and d were changed into those shown in Table 2, thereby manufacturing an image forming apparatus.

Eleventh Comparative Example

Processes performed in the first example were performed in the same way as in the first example except that form rolling of the first and second grooves was not performed ($D_1$=0, $D_2$=0), thereby manufacturing an image forming apparatus.

Note that the surface roughness of the main body of the developing roller was 6.8 μm before plating and 6.3 μm after plating.

2. Evaluation

For each of developing rollers obtained in the first to nineteenth examples and in the first to eleventh comparative examples as described above, the amount of charging and the toner consumption due to fog were measured by the following method.

Note that toner having an average grain size of 6.5 μm, which was of polyester resin, was used in the evaluation, and commercially available copier paper was used in the evaluation and the measurements were performed at a paper feed speed of 40 PPM.

[2. 1] Amount of Charging

Regarding image forming apparatus obtained in the first to nineteenth examples and in the first to eleventh comparative examples, each image forming apparatus was stopped during printing, and a cartridge was removed from the apparatus.

The charge amount distribution was measured using a powder charge amount distribution measurement device (E-spart analyzer made by Hosokawa Micron Corporation).

From the measured result, the amount of charging was determined.

[2. 2] Toner Consumption Due to Fog

In the image forming apparatus obtained in the first to nineteenth examples and in the first to eleventh comparative examples, toner was replenished corresponding to the consumption of toner every time 100 sheets were printed, and 2000 sheets in total were printed.

The toner consumption due to fog in stable times (after continuous printing of 100 sheets) and the toner consumption due to fog immediately after toner replenishing (toner consumption due to fog during replenishing) were measured.

[2. 3] Printing Characteristics

For the image forming apparatus obtained in the first to nineteenth examples and in the first to eleventh comparative examples, printing characteristics after 30,000 sheets had been printed were evaluated in accordance with the following four-stage standards by visual checking.

Excellent (E): no irregularity was observed.

Good (G): slight irregularity was observed.

Fair (F): remarkable irregularity was observed.

Poor (P): out of toner regulation

The results were summarized and shown in Tables 1 and 2.

In Tables 1 and 2, Y (Yes) for the conditions of R<$D_1$ and R<$D_2$ means “meeting the conditions”, and N (No) means “not meeting the conditions”.

TABLE 1

| | $R_o$ | | $D_1$ | | | $D_2$ | | | | |
|---|---|---|---|---|---|---|---|---|---|---|
| | (μm) | X times toner average particle size | (μm) | Y times toner average particle size | Ro < $D_1$ | (μm) | Z times toner average particle size | Ro < $D_2$ | top surface | 1st process |
| Example 1 | 5.8 | 0.89 | 6.5 | 1.00 | Y | 6.5 | 1.00 | Y | protrusion | centerless |
| Example 2 | 5.2 | 0.80 | 7.8 | 1.20 | Y | 7.8 | 1.20 | Y | protrusion | centerless |
| Example 3 | 5.8 | 0.89 | 11.1 | 1.71 | Y | 7.8 | 1.20 | Y | protrusion | centerless |
| Example 4 | 5.8 | 0.89 | 6.8 | 1.05 | Y | 11.1 | 1.71 | Y | protrusion | centerless |
| Example 5 | 5.8 | 0.89 | 6 | 0.92 | Y | 6.8 | 0.92 | Y | protrusion | centerless |
| Example 6 | 5.8 | 0.89 | 6.8 | 1.05 | Y | 6 | 1.05 | Y | protrusion | centerless |
| Example 7 | 5.8 | 0.89 | 6.8 | 1.05 | Y | 6.8 | 1.05 | Y | protrusion | centerless |
| Example 8 | 5.8 | 0.89 | 6.8 | 1.05 | Y | 6.8 | 1.05 | Y | protrusion | centerless |
| Example 9 | 5.8 | 0.89 | 6.8 | 1.05 | Y | 6.8 | 1.05 | Y | protrusion | centerless |
| Example 10 | 5.8 | 0.89 | 6.8 | 1.05 | Y | 6.8 | 1.05 | Y | protrusion | centerless |
| Example 11 | 5.8 | 0.89 | 6.8 | 1.05 | Y | 6.8 | 1.05 | Y | protrusion | centerless |
| Example 12 | 4.6 | 0.71 | 6 | 0.92 | Y | 6.8 | 1.05 | Y | protrusion | centerless |
| Example 13 | 4.6 | 0.71 | 6.5 | 1.00 | Y | 6 | 0.92 | Y | protrusion | centerless |
| Example 14 | 4.6 | 0.71 | 7.8 | 1.20 | Y | 6.5 | 1.00 | Y | protrusion | centerless |
| Example 15 | 6.1 | 0.94 | 6.5 | 1.00 | Y | 7.8 | 1.20 | Y | projection | blasting |
| Example 16 | 6.1 | 0.94 | 11.1 | 1.71 | Y | 6.5 | 1.00 | Y | projection | blasting |
| Example 17 | 5.3 | 0.82 | 6.5 | 1.00 | Y | 11.1 | 1.00 | Y | projection | blasting |
| Example 18 | 4.2 | 0.65 | 6 | 0.92 | Y | 6 | 0.92 | Y | projection | blasting |
| Example 19 | 3.3 | 0.51 | 6.5 | 1.00 | Y | 6.5 | 1.00 | Y | projection | blasting |

TABLE 1-continued

| | roughness of groove surface | groove cross angle (°) | d protrusion portion pitch (μm) | Evaluation: charging amount (μC/g) | Evaluation: consumption due to fog: stable time (g/kp) | Evaluation: consumption due to fog: just after replenish (g/kp) | Evaluation: printing |
|---|---|---|---|---|---|---|---|
| Example 1 | <top surface | 90 | 80 | 19.7 | 2 | 5 | E |
| Example 2 | <top surface | 90 | 80 | 17.5 | 3 | 8 | E |
| Example 3 | <top surface | 90 | 80 | 14.2 | 7 | 13 | E |
| Example 4 | <top surface | 90 | 80 | 15.6 | 5 | 10 | E |
| Example 5 | <top surface | 90 | 80 | 20 | 2 | 5 | E |
| Example 6 | <top surface | 60 | 80 | 19.9 | 2 | 4 | E |
| Example 7 | <top surface | 30 | 80 | 21.1 | 2 | 3 | E |
| Example 8 | <top surface | 90 | 55 | 19.9 | 2 | 4 | E |
| Example 9 | <top surface | 90 | 95 | 19.6 | 4 | 9 | E |
| Example 10 | <top surface | 90 | 40 | 18.9 | 2 | 3 | E |
| Example 11 | <top surface | 90 | 110 | 18.7 | 6 | 12 | E |
| Example 12 | <top surface | 90 | 80 | 19.5 | 3 | 8 | E |
| Example 13 | <top surface | 60 | 80 | 19.9 | 4 | 9 | E |
| Example 14 | <top surface | 90 | 80 | 18.2 | 5 | 10 | E |
| Example 15 | <top surface | 90 | 80 | 20.2 | 3 | 6 | E |
| Example 16 | <top surface | 90 | 17.3 | 17.3 | 7 | 15 | E |
| Example 17 | <top surface | 90 | 80 | 17.3 | 7 | 15 | E |
| Example 18 | <top surface | 60 | 80 | 18.6 | 2 | 6 | E |
| Example 19 | <top surface | 90 | 80 | 16.3 | 5 | 14 | E |

$R_o$: roughness of a top surface of a protrusion portion $D_1$: distance from an average line of a roughness curve of the roughness of the top surface of a protrusion portion to the deepest part of the first groove $D_2$: distance from an average line of a roughness curve of the roughness of the top surface of a protrusion portion to the deepest part of the second groove

TABLE 2

| | $R_o$ (μm) | $R_o$ X times toner average particle size | $D_1$ (μm) | $D_1$ Y times toner average particle size | Ro < $D_1$ | $D_2$ (μm) | $D_2$ Z times toner average particle size | Ro < $D_2$ | top surface | 1st process |
|---|---|---|---|---|---|---|---|---|---|---|
| Com Ex 1 | 1.2 | 0.18 | 6.5 | 1.0 | Y | 6.5 | 1.0 | Y | flat | centerless |
| Com Ex 2 | 11.1 | 1.71 | 6.5 | 1.0 | N | 6.5 | 1.0 | N | protrusion | centerless |
| Com Ex 3 | 0.65 | 0.10 | 6.5 | 1.0 | Y | 6.5 | 1.0 | Y | protrusion | centerless |
| Com Ex 4 | 19.5 | 3.00 | 6.5 | 1.0 | N | 6.5 | 1.0 | N | protrusion | centerless |
| Com Ex 5 | 6.5 | 1.00 | 5.2 | 0.8 | N | 7.8 | 1.2 | Y | protrusion | centerless |
| Com Ex 6 | 6.5 | 1.00 | 0.65 | 0.1 | N | 7.8 | 1.2 | Y | protrusion | centerless |
| Com Ex 7 | 6.5 | 1.00 | 19.5 | 3.0 | Y | 7.8 | 1.2 | Y | protrusion | centerless |
| Com Ex 8 | 6.5 | 1.00 | 6.5 | 1.0 | N | 5.2 | 0.8 | N | protrusion | centerless |
| Com Ex 9 | 6.5 | 1.00 | 6.5 | 1.0 | N | 0.65 | 0.1 | N | protrusion | centerless |
| Com Ex 10 | 6.5 | 1.00 | 6.5 | 1.0 | N | 19.5 | 3.0 | Y | protrusion | centerless |
| Com Ex 11 | 6.3 | 0.97 | 0 | 0.0 | N | 0 | 0.0 | N | — | centerless |

| | roughness of groove surface | groove cross angle (°) | d protrusion portion pitch (μm) | Evaluation: charging amount (μC/g) | Evaluation: consumption due to fog: stable time (g/kp) | Evaluation: consumption due to fog: just after replenish (g/kp) | Evaluation: printing |
|---|---|---|---|---|---|---|---|
| Com Ex 1 | <top surface | 90 | 80 | 13.0 | 6 | 20 | E |
| Com Ex 2 | <top surface | 90 | 80 | 10.2 | 10 | 30 | P |
| Com Ex 3 | <top surface | 90 | 80 | 13.0 | 6 | 21 | E |
| Com Ex 4 | <top surface | 90 | 80 | 7.2 | 17 | 35 | P |
| Com Ex 5 | <top surface | 90 | 80 | 11.8 | 8 | 25 | G |
| Com Ex 6 | <top surface | 90 | 80 | 10.9 | 10 | 28 | P |
| Com Ex 7 | <top surface | 90 | 80 | 9.8 | 12 | 31 | P |
| Com Ex 8 | <top surface | 90 | 80 | 12.6 | 7 | 21 | G |
| Com Ex 9 | <top surface | 90 | 80 | 11.1 | 10 | 27 | P |

TABLE 2-continued

| | | | | | | | |
|---|---|---|---|---|---|---|---|
| Com Ex 10 | <top surface | 90 | 80 | 8.5 | 12 | 31 | P |
| Com Ex 11 | — | — | — | 12.2 | 11 | 27 | P |

$R_o$: roughness of a top surface of a protrusion portion
$D_1$: distance from an average line of a roughness curve of the roughness of the top surface of a protrusion portion to the deepest part of the first groove
$D_2$: distance from an average line of a roughness curve of the roughness of the top surface of a protrusion portion to the deepest part of the second groove As apparent from Table 1, any one of developing rollers of the invention was excellent in terms of the amount of charging, the toner consumption due to fog as well as printing.

In particular, it was found that the toner consumption due to fog immediately after replenishing toner was small.

In the first to fifth examples and the twelfth to fourteenth examples, the surface roughness and $D_1$ and $D_2$ of the top surface of the protrusion portion were within a range of 0.5 to 2 times the average grain size of toner, and therefore the developing rollers in theses examples were particularly excellent in terms of the amount of charging, the toner consumption due to fog, and printing characteristics.

In the sixth and seventh examples, the angle at which the first groove and the second groove intersect each other was smaller than 90°, and therefore the developing rollers in theses examples were particularly excellent in terms of the amount of charging, the toner consumption due to fog, and printing characteristics.

In the eighth and ninth examples, the pitch between the protrusion portions adjacent each other was 50 to 100 μm, and therefore the developing rollers in theses examples were particularly excellent in terms of the amount of charging, the toner consumption due to fog, and printing characteristics.

In the tenth and eleventh examples, while the pitch between the protrusion portions adjacent each other was out of the foregoing range, the surface roughness and $D_1$ and $D_2$ of the top surface of the protrusion portion were within a range of 0.5 to 2 times the average grain size of toner, and therefore the developing rollers in theses examples were excellent in terms of the amount of charging, the toner consumption due to fog, and printing characteristics.

In the fifteenth to nineteenth examples, it was found that the developing rollers were excellent in terms of the amount of charging, the toner consumption due to fog, and printing characteristics regardless of the grinding method of a roller base material.

In contrast, the developing rollers in the comparative examples did not meet predetermined conditions of the invention, and therefore any one of them was inferior to the developing rollers in the examples in terms of the amount of charging, the toner consumption due to fog, and printing characteristics.

In particular, in the first to fourth comparative examples, the surface roughness of the top surface of the protrusion portion was out of the range of 0.5 to 2 times the average grain size of toner, and therefore the developing rollers were inferior in charging characteristic.

In the fifth to tenth comparative examples, $D_1$ and $D_2$ each did not meet the condition of being 0.5 to 2 times the average grain size of toner or the conditions of $R<D_1$ and $R<D_2$, and therefore the developing rollers were inferior in terms of any of the amount of charging, the toner consumption due to fog, and printing characteristics.

What is claimed is:

1. A developing roller on a circumferential surface of which toner is held, comprising:

a plurality of first grooves formed in parallel to each other at approximately equal intervals, each in a direction inclined to a circumferential direction of the circumferential surface of the developing roller;

a plurality of second grooves formed in parallel to each other at approximately equal intervals, each in a direction inclined to the circumferential direction of the circumferential surface of the developing roller, each second groove intersecting each first groove, the first groove and the second groove each having a U-shaped cross section; and a protrusion portion disposed in an area surrounded by the first groove and the second groove, wherein the first groove and the second groove are configured to contain the toner and roll the toner to the protrusion portion to put the toner into contact with the circumferential surface, wherein:

the protrusion portion has on a top surface thereof a plurality of minute projections;

a surface roughness Rz of the top surface is $R_O$ and $R_O$ is 0.5 to 2 times an average grain size of a particle of the toner;

a distance from an average line of a roughness curve of the surface roughness $R_O$ to a deepest part of the first groove is $D_1$ and a distance from the average line of the roughness curve of the surface roughness $R_O$ to a deepest part of the second groove is $D_2$, each of $D_1$ and $D_2$ is 0.5 to 2 times the average grain size of the particle of the toner; and a relationship of the $R_O<D_1$ and the $R_O<D_2$ is satisfied.

2. The developing roller according to claim 1, wherein each of the plurality of minute projections is formed in a form of a protrusion extending along the circumferential direction of the circumferential surface of the developing roller.

3. The developing roller according to claim 1, wherein the first groove and the second groove each have an inner surface having a surface roughness Rz smaller than the surface roughness $R_O$ of the top surface of the protrusion portion.

4. The developing roller according to claim 1, wherein the first groove and the second groove intersect each other at an angle smaller than 90°.

5. The developing roller according to claim 1, wherein the protrusion portion includes a plurality of protrusion portions and a pitch between the protrusion portions adjacent each other is 50 to 100 μm.

6. A developing apparatus comprising the developing roller according to claim 1.

7. An image forming apparatus comprising the developing apparatus according to claim 6.

* * * * *